United States Patent [19]

Heller et al.

[11] Patent Number: 5,572,195

[45] Date of Patent: Nov. 5, 1996

[54] SENSORY AND CONTROL SYSTEM FOR LOCAL AREA NETWORKS

[75] Inventors: Alan C. Heller, San Antonio, Tex.; Steven Springmeyer, Bellevue, Wash.; Christopher W. Fox, Englewood, Colo.

[73] Assignee: Precision Tracking FM, Inc., Dallas, Tex.

[21] Appl. No.: 283,832

[22] Filed: Aug. 1, 1994

[51] Int. Cl.[6] .................................................. H04Q 1/00
[52] U.S. Cl. .............................. 340/825.35; 340/825.44; 342/451
[58] Field of Search ..................... 340/825.36, 825.49, 340/825.35; 342/450, 451, 463

[56] References Cited

U.S. PATENT DOCUMENTS

| | | | |
|---|---|---|---|
| 4,275,385 | 6/1981 | White | 340/825.49 |
| 5,062,151 | 10/1991 | Shipler | 340/825.49 |
| 5,119,104 | 6/1992 | Heller | 342/450 |
| 5,194,856 | 3/1993 | Zijlstra | 340/825.35 |
| 5,363,425 | 11/1994 | Mufti et al. | 340/825.49 |
| 5,426,425 | 6/1995 | Conrad et al. | 340/825.49 |

*Primary Examiner*—Brian Zimmerman
*Attorney, Agent, or Firm*—Pravel, Hewitt, Kimball & Krieger

[57] ABSTRACT

An object location, control, and tracking system is implemented using an object identifier variable-based protocol such as SNMP. Infrared sensors, touch memory ports, passive infrared sensors, and external device controllers are all accessed using object identifier variables and in this way stimuli events are reported to a computer on the network, and the external devices are controlled responsive to the stimuli.

19 Claims, 9 Drawing Sheets

NETWORKED DATA COLLECTION WITH SINGLE WORKSTATION

STAND ALONE CONFIGURATION

NETWORKED DATA COLLECTION WITH MULTIPLE NETWORKED WORKSTATIONS

NETWORKED DATA COLLECTION AND WORKSTATIONS ON THE SAME NETWORK

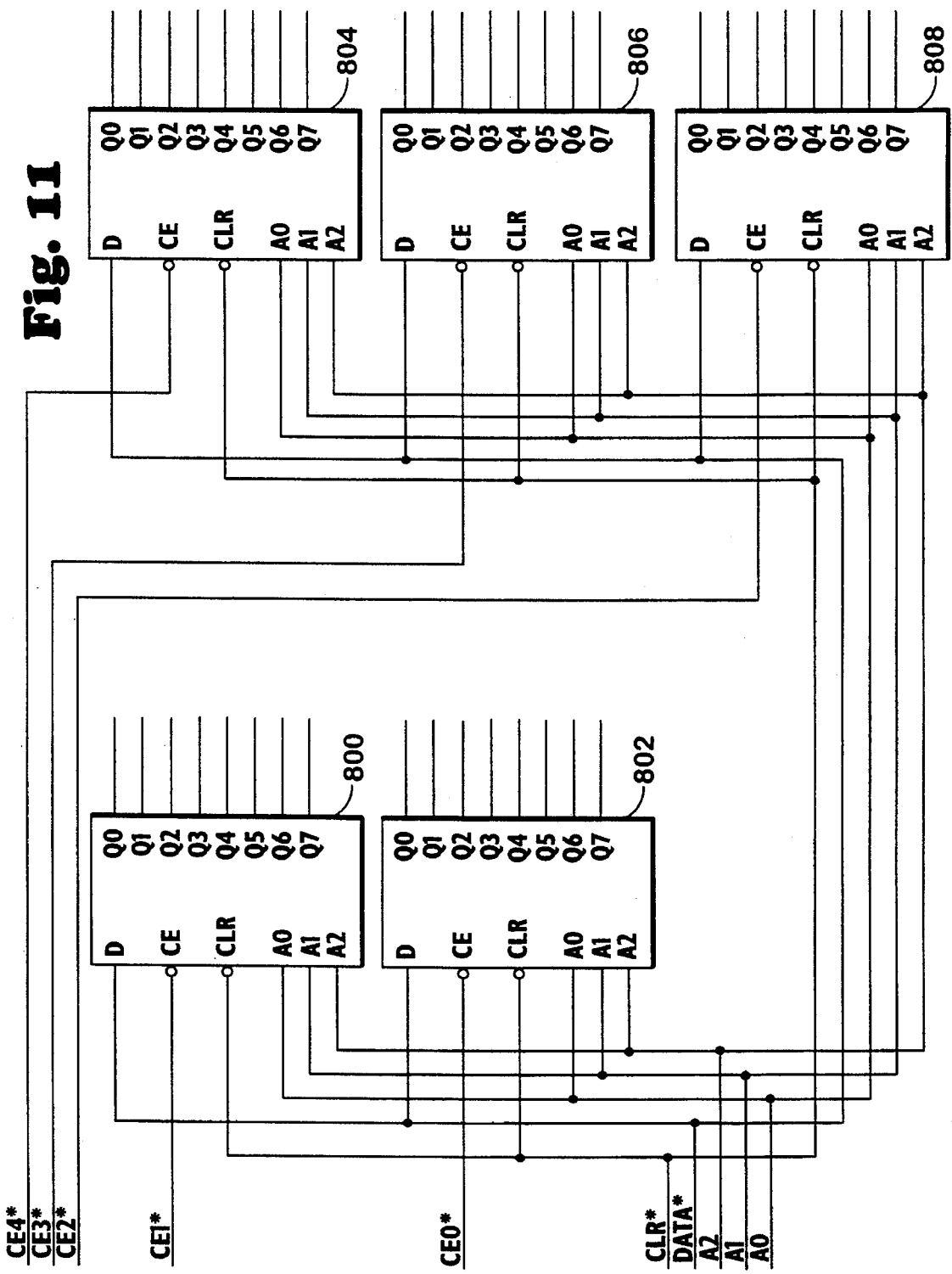

SENSORY AND CONTROL SYSTEM FOR LOCAL AREA NETWORKS

BACKGROUND OF THE INVENTION

1. Field of the Invention

The invention relates to object location and tracking systems, and more specifically, to an object location and tracking system adapted for a local area network and further providing object based communications with and control of physical devices within the environment.

2. Description of the Related Art

Object location and tracking systems are well known to the art. A number of systems have been developed using various techniques, such as infrared, radio frequency, and ultrasonic, for continuously tracking the positions of personnel and objects within a facility.

Infrared techniques have proven especially well-suited to this task. In one particular system, the individuals or objects to be tracked are furnished with infrared transmitters known as "TAGs" containing a unique identification code periodically transmitted to receivers located throughout a facility. Such a system is disclosed in U.S. Pat. No. 4,275,385 to White, which is hereby incorporated by reference. A number of other patents have offered refinements to the techniques in the White patent, such as that disclosed in U.S. Pat. No. 5,119,104 to Heller, issued Jun. 2, 1992, and entitled "Location System Adapted for Use in Multipath Environments", which is hereby incorporated by reference.

But in today's networked environment, such infrared object location and tracking systems can be unwieldy to implement. The microprocessor world has moved steadily and continuously towards network environments, but the various tracking systems previously presented have not adequately addressed the need to smoothly integrate object location and tracking hardware into modern systems. Therefore, it would be greatly desirable to logically and elegantly integrate object location and tracking system hardware into microcomputer network based environments.

Further, while use of infrared TAGs in an object location and tracking system can provide basic functionality in a real-world environment, a number of other elements would be greatly desirable to enhance such systems. Because a TAG can be worn by someone other than its true owner, and because TAGs provide for area identification rather than physical contact identification, it is thus desirable to provide for a more physical manifestation of actual presence.

Further, TAGs only address the detection aspect of an object location and tracking system. It would be greatly desirable to also provide seamlessly integrated facilities for responding to such detection, whether indicated by a TAG or by other presence detection methods.

Finally, in a hardware system implementing all of the above, any reduction in device cost would be greatly desirable.

SUMMARY OF THE INVENTION

A method and apparatus are provided according to the invention for implementing an object tracking and location system using a network that implements object identifier variables. A computer is attached to the network, as well as interface circuitry for interfacing with infrared sensors including passive infrared sensors, touch ports, and external device controllers.

The computer communicates with the interface circuitry using object identifier variables. The object identifier variables identify both the unique identification of the various sensors, touch ports, and external controllers, as well as the unique identities of infrared transmitters that come within the proximity of an infrared sensor, as well as touch memories that are placed within the touch ports.

The computer accesses these devices using object identifier variables and a variable-based protocol, both receiving stimuli from the devices and sending control information to control the external devices.

Using this system, a standard networking protocol based on an object identifier paradigm provides for a device independent solution to problems of interconnecting object location, tracking, and control devices on the network.

BRIEF DESCRIPTION OF THE DRAWINGS

A better understanding of the present invention can be obtained when the following detailed description of the preferred embodiment is considered in conjunction with the following drawings, in which:

FIG. 11 is a schematic illustration showing circuitry used in conjunction with the circuitry of FIG. 9 to implement a relay controller;

DETAILED DESCRIPTION OF THE PREFERRED EMBODIMENT

The Hardware Environment

Figure 1:
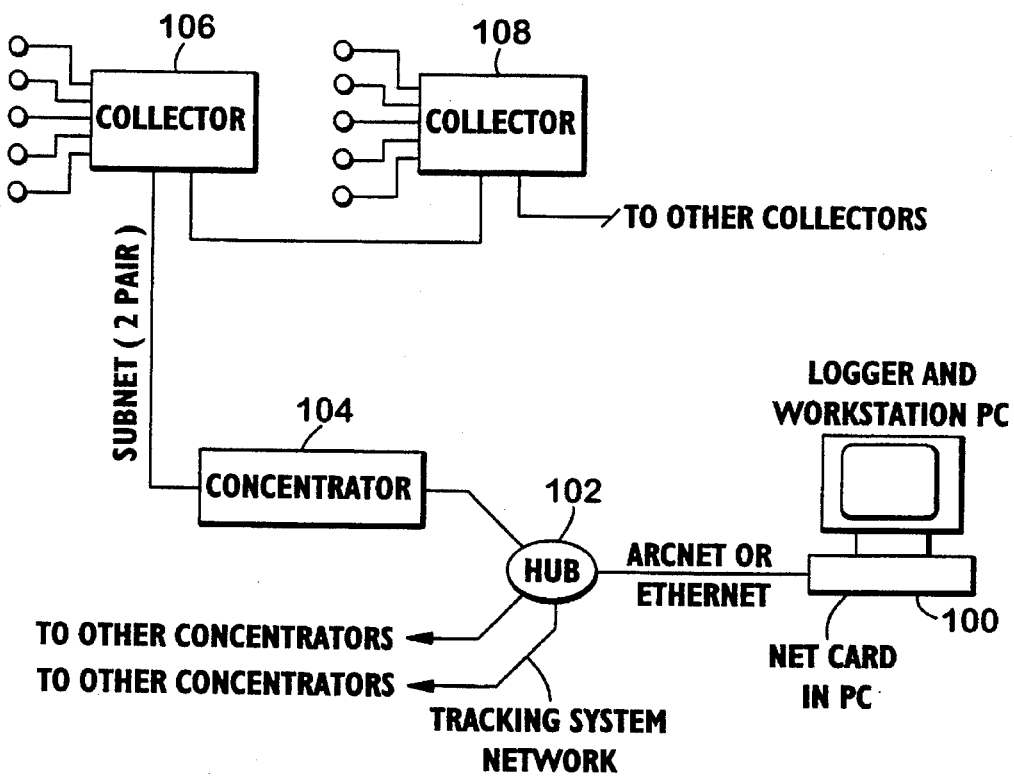
FIGS. 1–4 are block diagrams of various systems in which the network environment according to the invention could be implemented.

Turning now to the drawings, FIGS. 1–4 are block diagram illustrations of systems typically used to implement various aspects according to the invention. FIG. 1 shows a system implementing networked data collection with a single workstation. A logger and workstation PC 100 is connected to a hub 102 using standard networking hardware, preferably either Arcnet or Ethernet. The hub 102 is then connected to a concentrator 104, and multiple concentrators can be present in the network. The concentrator 104 is connected to collectors 106 and 108 through a subnetwork, preferably implemented using twisted pair wires. The collectors 106 and 108, as can be seen, are daisy chained, and further collectors can also be used in the system. As will be discussed below in conjunction with FIG. 5, the collectors 106 and 108 interface with various hardware sensing and control devices in the object tracking and location system implemented according to the invention.

Figure 2:
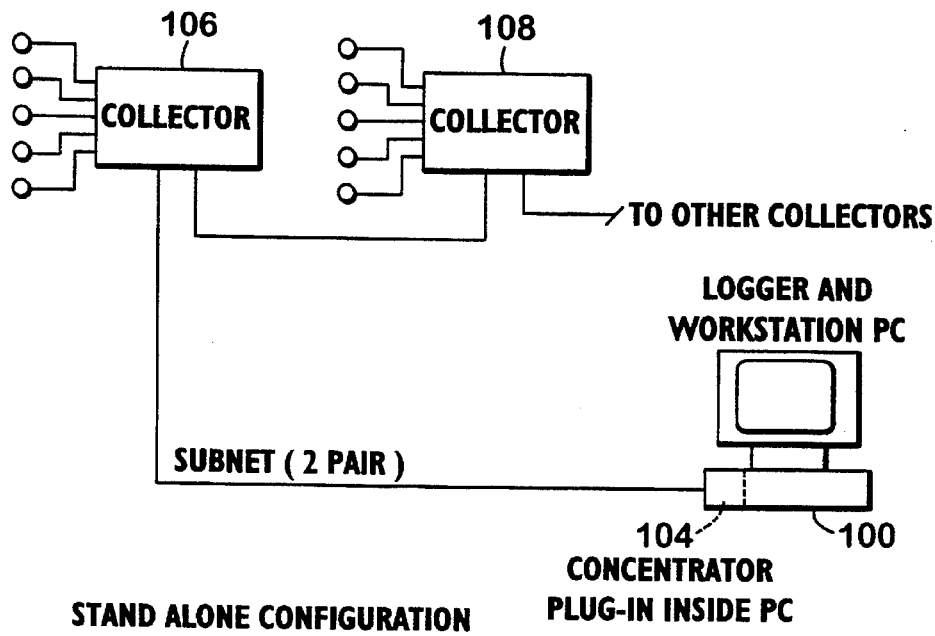

FIG. 2 is a block diagram illustrating the single workstation embodiment of the invention shown in FIG. 1, but with the hardware of the concentrator 104 placed within the logger and workstation PC 100 itself. In this system, the network has been eliminated, and the concentrator 104 would preferably directly communicate with any software desiring to communicate with the collectors 106 and 108.

Figure 3:
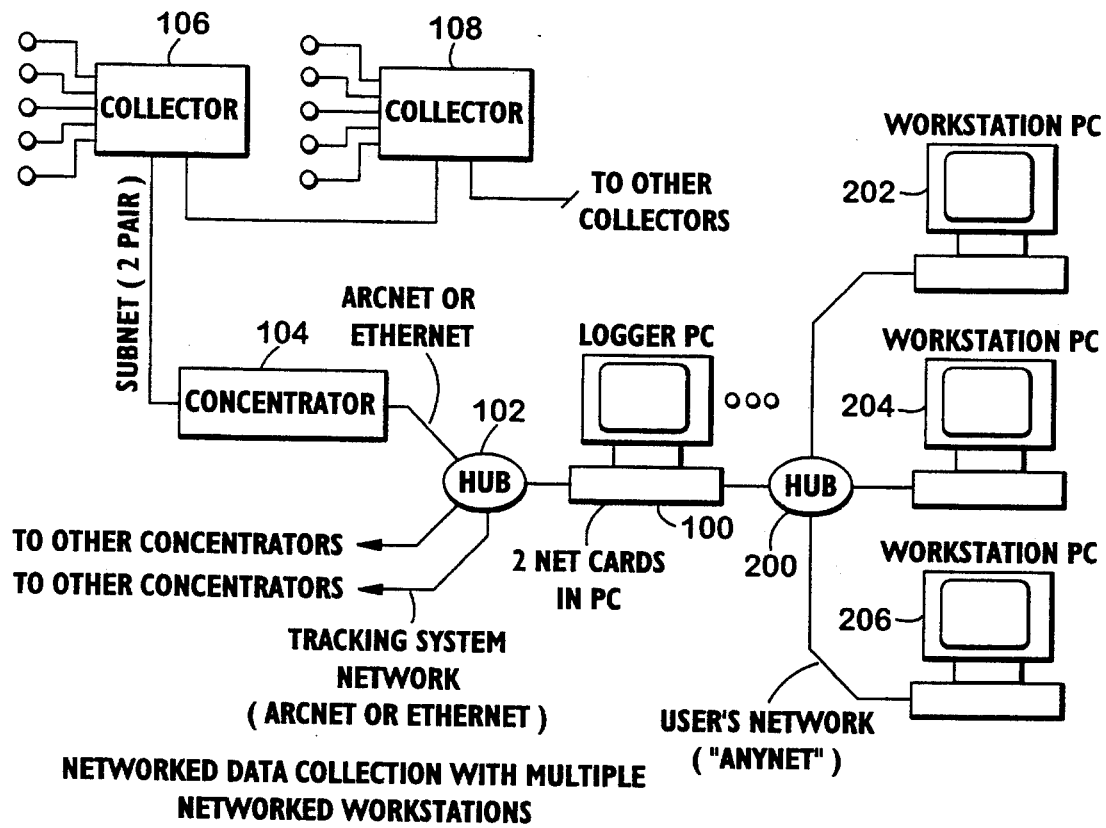

FIG. 3 illustrates yet another network embodiment according to the invention. In this embodiment, the logger PC 100 no longer acts as a workstation, but instead acts as a bridge between two networks. The first network is the equivalent to the network shown in FIG. 1, including the hub 102 connecting to the concentrator 104, which in turn connects to the collectors 106 and 108. Again, the hub 102 is preferably for an Ethernet or Arcnet network.

The logger PC 100 then bridges to another network with a hub 200. This can be any network, including a network other than an Arcnet or Ethernet. Workstations 202, 204, and 206 further connect to the hub 200 of this network. The workstations 202, 204, and 206 communicate with the logger PC 100, which in turn communicates with the devices connected to the collectors 106 and 108.

Figure 4:
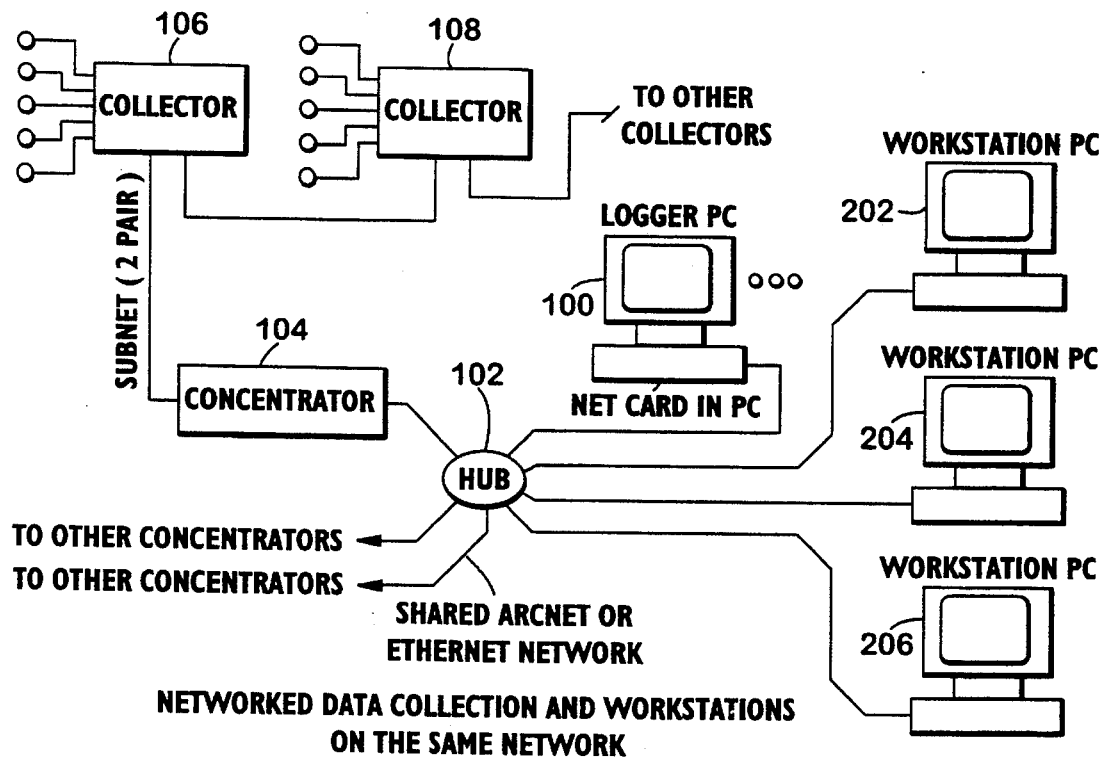

FIG. 4 illustrates yet another system according to the invention. In this system, the logger PC 100 does not bridge between hubs 102 and 200, but instead simply connects to the hub 102 and communicates using standard networking protocols. In this configuration, the logger PC 100 communicates with the concentrator 104 using standard networking protocols, and gathers information from the concentrator 104 and controls various devices based on messages received from and sent to the concentrator 104.

The workstations 202, 204, and 206 then communicate using standard networking protocols with the logger PC 100 to obtain information provided by the concentrator 104. In this configuration, it is also possible for the workstations 202, 204, and 206 to communicate directly with the concentrator 104 or to "eavesdrop" on messages to the logger PC 100. Generally, however, the workstations 202, 204, and 206 will receive information concerning the concentrator 104 only from the logger PC 100.

Figure 5:
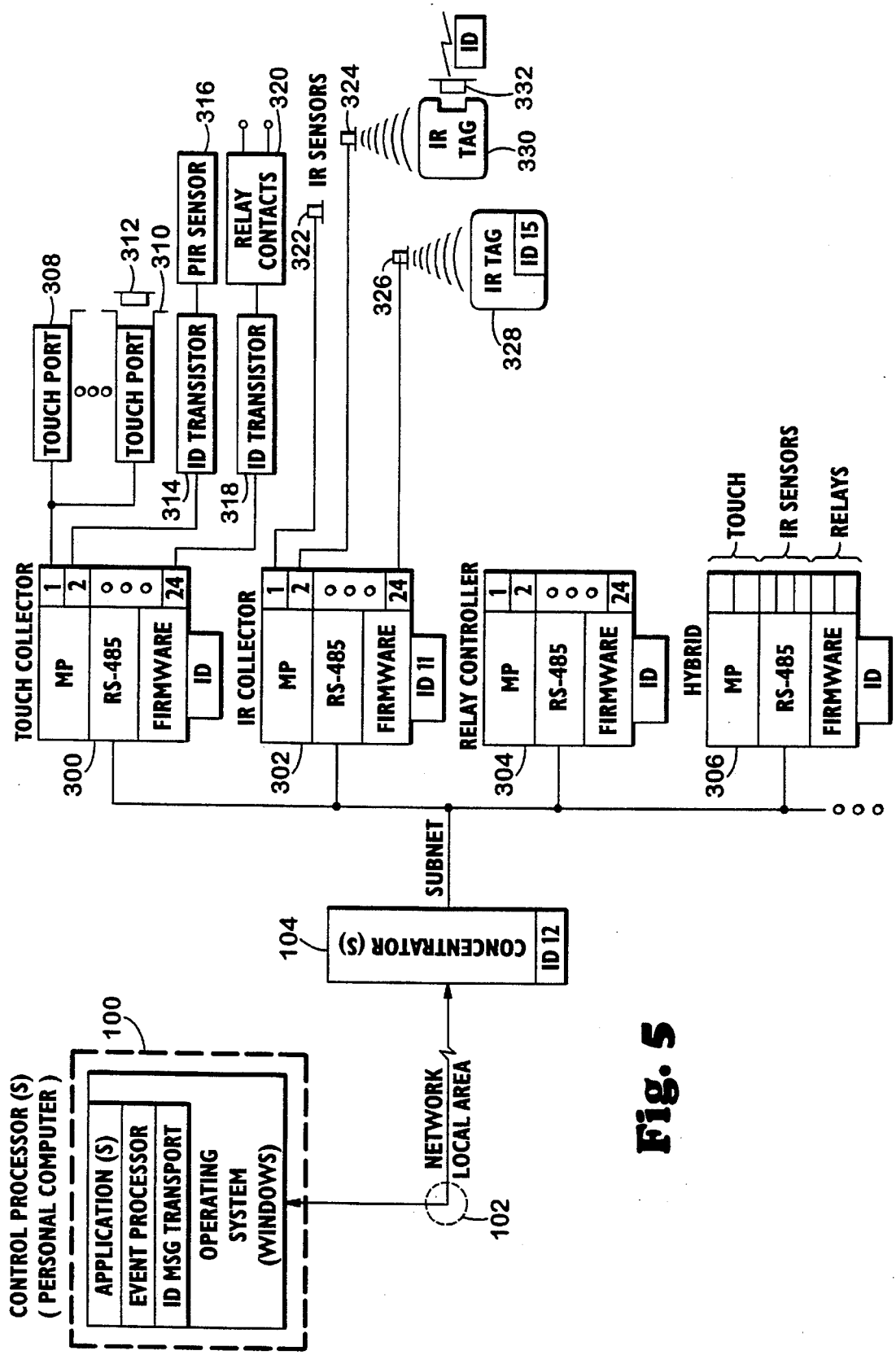
FIG. 5 is a block diagram showing further details of the network sensory and control system according to the invention as shown in FIGS. 1–4.

FIG. 5 is a block diagram further illustrating various software control blocks and hardware in a system, such as the system illustrated in FIG. 4, showing further details of the network object location and tracking system, along with the various devices that are part of that system. The logger PC 100 contains certain levels of software used to access the concentrator 104 on the network, the hub of which is the hub 102. Typically, these software blocks include applications software running on a Windows operating system by Microsoft Corporation. This applications software communicates with the hub 102 through an event processor, which in turn includes an I/O message transport layer. The software is used to communicate through the local area network to the concentrator 104, which has a unique identification. Of note, each concentrator 104 preferably has its unique identification embedded during the manufacturing process.

The concentrator 104 then communicates over a subnetwork to a touch collector 300, an infrared collector 302, a relay controller 304, and a hybrid controller 306. The touch collector 300, infrared collector 302, relay controller 304, and hybrid controller 306, are what are generically referred to as the collectors 106 and 108 in FIGS. 1–4.

Each of these devices preferably includes an embedded microcontroller, an RS485 interface for communicating with the concentrator 104, and firmware. Each of these devices preferably further includes a uniquely embedded identification code similar to that discussed in conjunction with the concentrator 104.

The touch collector 300 includes interfaces for communicating with touch ports 308 and 310, which in turn can receive a touch memory 312 with its own uniquely encoded identifications. Twenty-four such ports are shown, and they shall be referred to as "channels" of this "node," each collector or controller 300–306 being assigned a node number. The touch memory 312 is preferably manufactured by Dallas Semiconductor, Part No. DS 1990. Further details of these touch ports 308 and 310 and the touch memory 312 are further discussed below in conjunction with FIGS. 6–8. It will be appreciated throughout this discussion that other registered serial number devices could be similarly used according to the invention, and touch memories are only a single application.

The touch collector 300 also includes an interface for an addressable transistor 314, which in turn communicates with a passive infrared sensor (PIR) 316. The addressable transistor 314 is a transistor which is activated by addressing it through a uniquely coded identification, such as that discussed in conjunction with the touch memory 312, and is preferably implemented using Dallas Semiconductor Part No. DS 2405. These addressable transistors 314 and 316 each include a unique 48-bit identification code. By addressing that uniquely coded identification, communication can be established with the passive infrared sensor 316. As with the touch memories, other devices than addressable transistors could similarly be used according to the invention. Thus, "addressable transistors" generically refers to devices that respond to a unique identification code to provide for electrical control.

Another addressable transistor 318 is connected to relay contacts 320 for controlling external devices, such as an electronic door lock.

The infrared collector 302 connects to infrared sensors 322, 324, and 326. These infrared sensors receive transmissions from infrared TAGs 328 and 330. These TAGs provide unique identification codes, similar to those discussed in conjunction with the concentrator 104, and is also disclosed in U.S. Pat. No. 5,119,104, which is hereby incorporated by reference.

The TAG 330 receives its unique identification code from a touch memory 332. The touch memory 332 provides a unique identification code for the TAG 330, instead of the infrared TAG 330 including an embedded unique identification code such as the TAG 328. This is further described in U.S. patent application Ser. No. 08/083,725, filed Jun. 25, 1993, entitled "A Method for Receiving and Transmitting Optical Data and Control Information to and from Remotely Located Recivers and Transmitters in an Optical Locator System," which is hereby incorporated by reference.

The relay controller 304 is used to control external devices.

The hybrid controller 306 combines the various aspects of the touch collector 300, the infrared collector 302, and the relay controller 304, thus providing both sensors for touch memories, sensors for infrared TAGs, and control for external devices.

Figure 6:
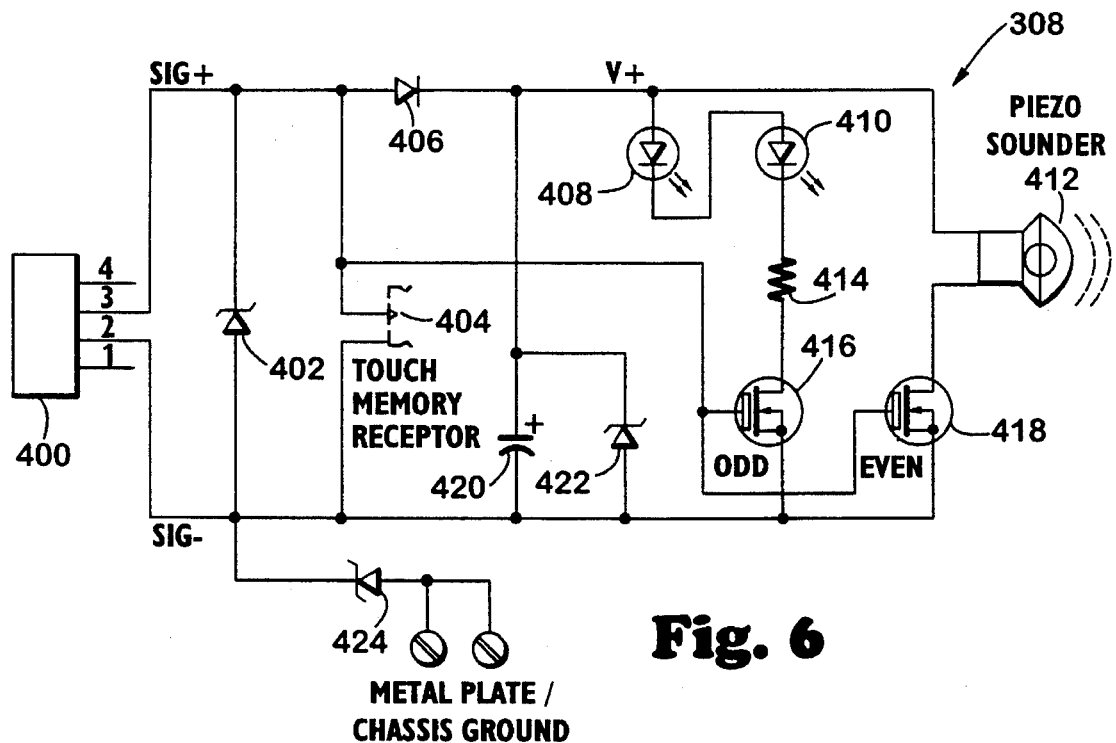
FIG. 6 is a schematic illustration of a touch memory port for use according to the present invention.

FIG. 6 is a schematic showing the details of the touch port 308. The touch port 308 is connected to the touch collector 300 via a jumper 400 with two signal lines SIG+ and SIG–. Between these two lines is a diode 402 preventing SIG+ from dropping below SIG–. The SIG+ line is also connected to the active portion of a touch memory receptor 404. The SIG– line is connected to the ground portion of the touch memory receptor 404. SIG+ is also provided through a diode 406 to light emitting diodes 408 and 410, which are in series, as well as to a piezoelectric sounder 412. The anode of the light emitting diode 410 is connected through a current limiting resistor 414 to the drain of an addressable transistor 416. The piezoelectric sounder 412 is similarly connected to the drain of an addressable transistor 418. The addressable transistors 416 and 418 are preferably part no. DS2405, manufactured by Dallas Semiconductor. The source of the addressable transistors 416 and 418 are connected to the SIG– line. The gates of the addressable transistors 416 and 418 are driven by the SIG+ line. These addressable transistors 416 and 418 include a unique identifying code that can be retrieved by signaling the addressable transistor to respond through their gates. This is documented in the Dallas Semiconductor product specification. The addressable transistors 416 and 418 are preferably selected such that the identification of the addressable transistor 416 ends in an odd digit, whereas identification of the addressable transistor 418 ends in an even digit.

The SIG+ line signal provided through the diode 406 is preferably additionally buffered by a capacitor 420, and its voltage is limited by a zener diode 422. SIG– is also limited below 40 V by a zener diode 424, which is connected to chassis ground.

In operation, when a touch memory device is placed into the touch memory receptor 404, it provides a signal via SIG+ and SIG– to the touch collector 300. The microprocessor in the touch collector 300 then queries the touch memory within the touch memory receptor 404 to provide its unique identification, which it does.

To control the light emitting diodes 408 and 410, as well as the piezoelectric sounder 412, the touch collector 300 provides a signal corresponding to the unique identifying code of either the addressable transistor 416 or 418. This causes that particular transistor 416 or 418 to turn on or off, appropriately enabling or disabling the visual or audio response.

In practice, when a touch memory device is placed in the touch memory receptor 404, its identification is passed up to the touch collector 300, which in turn passes both the port, or channel, number of the touch memory receptor, the unique identifying code of the touch memory device, and the unique identification code of the touch collector 300, on to the concentrator 104. The concentrator 104 in turn passes this information over the local area network to the logger PC 100. To acknowledge reception of this activation or deactivation, whichever may occur, the logger PC 100 then sends a message through the concentrator 104 to the touch collector 300, which enables the light emitting diodes 408 and 410, buzzes the piezoelectric sounder 412, or both, by supplying the unique identification codes to the addressable transistors 416 and 418. The logger PC 100 maintains a map of which addressable transistors 416 and 418 are associated with the particular touch memory receptor 404.

As an application, for example, suppose an employee keeps an identifying touch memory device on his keychain. To enter a facility, the employee touches the touch memory 312 into the touch memory receptor 404. The system recognizes that particular unique identifying code, and if that code representing that employee is authorized, activates the relay contacts 320 through the addressable transistor 318, disabling a magnetic door lock on a door corresponding to where the touch port 308 was located. The system further buzzes the piezoelectric sounder 412 and enables the light emitting diodes 408 and 410. The employee then enters. This is an application where a touch memory 312 would be preferable to a TAG, as the TAGs may be contained within the facilities themselves, whereas the touch memory 312 would be available at all times. The touch memory 312 could similarly be used within the facility at sensitive areas to prevent activation of doors by passing individuals and instead require the actual placement of the touch memory into the touch memory receptor 404. The touch memory 312 could similarly be used to identify part locations on an assembly line.

Figure 7:
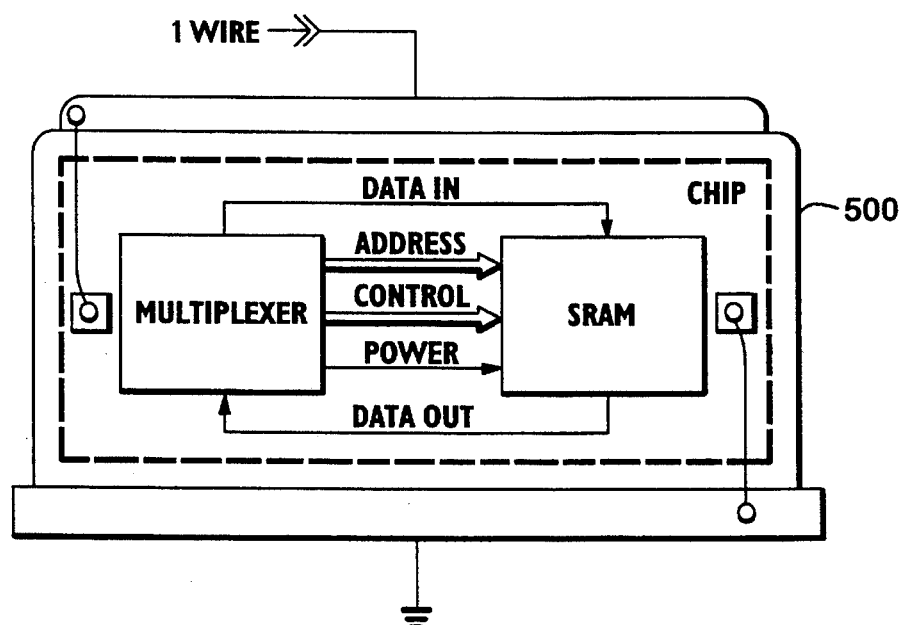
FIG. 7 is a diagram illustrating the internal components of a touch memory device to be used with the touch memory port of FIG. 6.

FIG. 7 illustrates the internal components of the Dallas Semiconductor touch memory itself. A touch memory chip 500 includes a multiplexer and a static RAM backed up by battery power. Further, the touch memory 500 contains a unique identification code not shown. The multiplexer, in response to an appropriate code, provides the data in the SRAM to the conductive portion of the touch memory 500. In this way, the touch memory can be polled and can return its unique identifying code.

Figure 8:
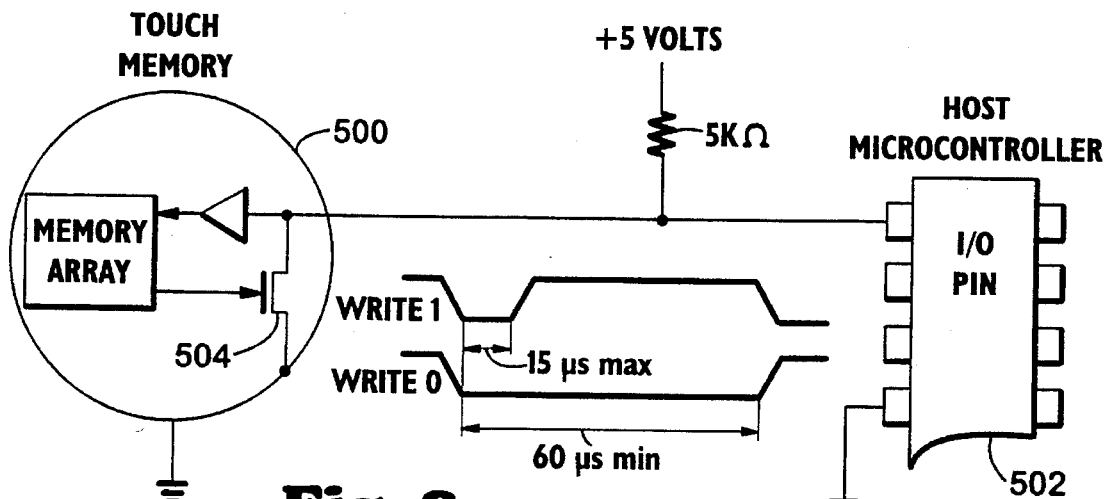
FIG. 8 is a diagram further illustrating the use of touch memory with a touch memory port.

FIG. 8 is a diagram further illustrating how the touch memory chip 500 is coupled to a host microcontroller 502. As can be seen, upon appropriate codes from the host microcontroller 502, the touch memory chip 500 memory array sequentially activates and deactivates an internal transistor 504, providing a signal to the host microcontroller 502. This is all further described in the Dallas Semiconductor materials regarding touch memories.

Figure 9:
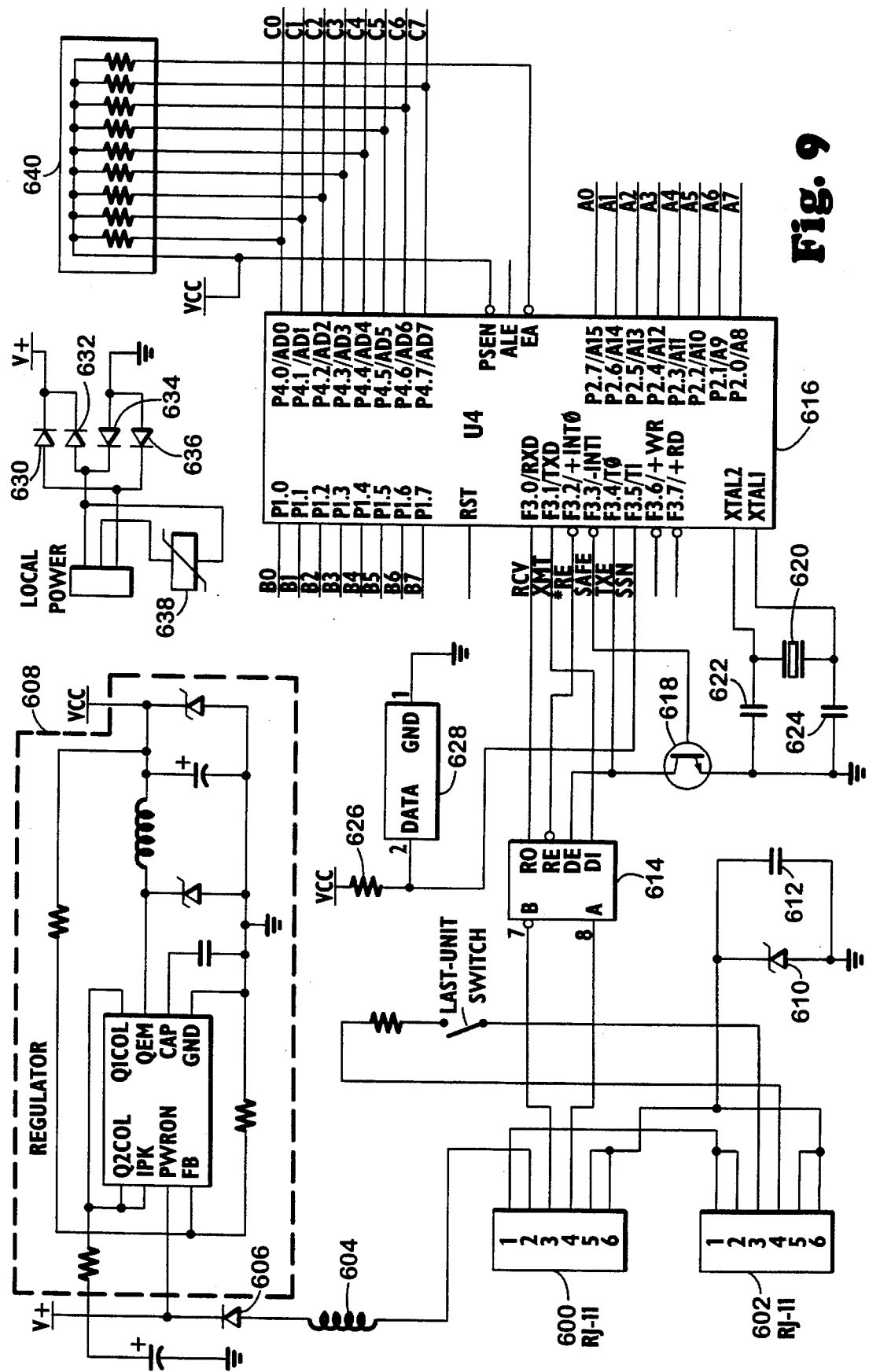
FIG. 9 is a schematic illustration showing circuitry that would be used with the touch collector, infrared collector, relay controller, or hybrid controller illustrated in FIG. 5.

FIG. 9 is a schematic illustrating typical front-end circuitry used within the touch collector 300, the infrared collector 302, the relay controller 304, and the hybrid controller 306. These devices are typically daisy chained through RJ11 connectors 600 and 602, which form a link over the RS-485 twisted pair subnetwork. Power is provided through pins 1 and 2 of the connectors 600 and 602, filtered through an inductor 604, passed through a diode 606, and filtered by regulator circuitry 608, which provides filtered power VCC.

Ground is provided through pins 5 and 6 of the RJ11 connectors 600 and 602, through a zener diode 610, and further filtered by a filtering capacitor 612.

The signals on the RJ11 connectors are carried by pins 3 and 4, and are standard RS-485 signals. These signals are driven and received by a line driver 614, which is preferably an LTC 485 by Maxim Corp. The RO pin of the line driver 614 is connected to a receive input RXO of a microcontroller 616, preferably a DS2253 by Dallas Semiconductor, the RE line is connected to receive enable RE, the DE line is connected to transmit enable TXE, and the DI line is connected to a transmit output TXO. One general purpose port pin of the microcontroller 616 is pulled to VCC by a pullup resistor 626, but is also connected to an RSN (registered serial number) chip 628 that provides a unique serial number to the microcontroller 616. The RSN chip 628 is preferably a DS 2200 by Dallas Semiconductor. The clock to the microcontroller 616 is provided by a crystal 620 across the crystal inputs to the microcontroller 616. These inputs are further filtered to ground through capacitors 622 and 624. The microcontroller 616 is further enabled by its enable input being pulled up to VCC through a resistor 626.

Local power is provided by rectifying V+ from the diode 606 through rectifier diodes 630, 632, 634, and 636. Voltage spikes on the local power are prevented using a transorb 630.

The microcontroller 616 has general purpose input/output channels illustrated as A0–A7, B0–B7, and C0–C7. Lines C0–7 are shown to be pulled up to VCC through a resistor pack 640, and can in turn be pulled down by the microcontroller 616 through its PSEN output. Lines A0–A7 and B0–B7 are similarly pulled up and down by circuitry not shown.

Figure 10:
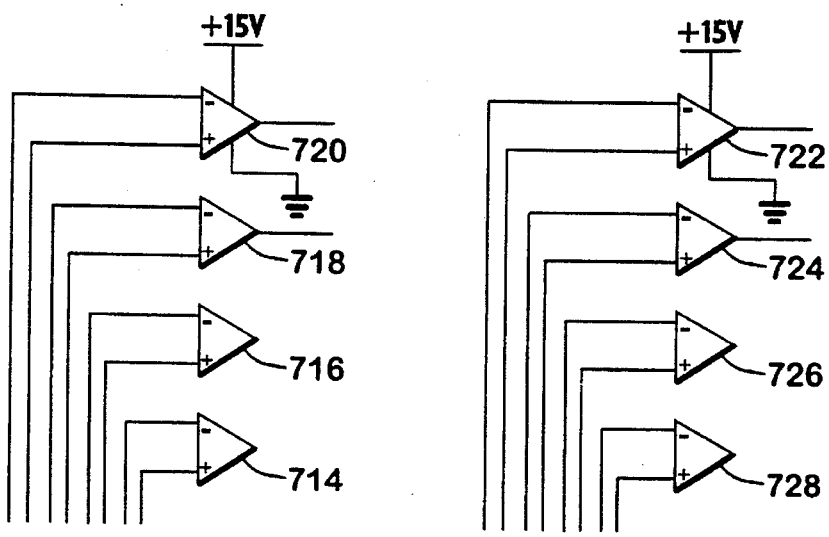
FIG. 10 is a schematic illustration showing circuitry used in conjunction with FIG. 9 to implement an infrared collector.

When the circuitry of FIG. 9 is implemented in the infrared collector 302, additional circuitry, shown in the schematic of FIG. 10, provides signals from the sensors 332–326 to the channels of the microcontroller 616. A comparator 714 is coupled to one of the sensors 332–336, and provides a high voltage output in response to a signal being received by that sensor. Similar sensing is provided by comparators 716 through 728. These comparators are preferably LN339 devices, single supply, low powered, low offset voltage quad comparators. The outputs of the comparators 714 through 728 are provided to the channel inputs of the microcontroller 616 in FIG. 9. The microcontroller 616 thus receives signals passed from TAGs through the infrared sensitive diode 700, and forms appropriate messages for transmission on the subnetwork.

In the relay controller 304, circuitry illustrated by the schematic of FIG. 11 is used. In this configuration, the ports of the microcontroller 616 are implemented as outputs, and are connected to five chip enable lines CE0*–CE04*, to a clear line CLR*, to a data line DATA, and to three device select lines A0–A2. In this disclosure, an "*" indicates logical active low signal. CE0*–CE04* are provided to latching decoders 800 to 808, with one chip enable line being provided to each. CLR* is provided to the clear inputs of each of the latching decoders, DATA is provided to the data input of each latching decoder, and A1–A3 are provided to the address lines of the latching decoders. Using this circuitry, the 40 outputs of the latching decoders 800–808 can each separately drive a relay driven device. A write command with a particular chip enable selected, say CE0*, and with the address lines appropriately set, such as to 000, will thus latch the data to the data input of latching decoder 802 to its Q0 output. In this way, the states of each of the 40 outputs can be set.

Figure 12:
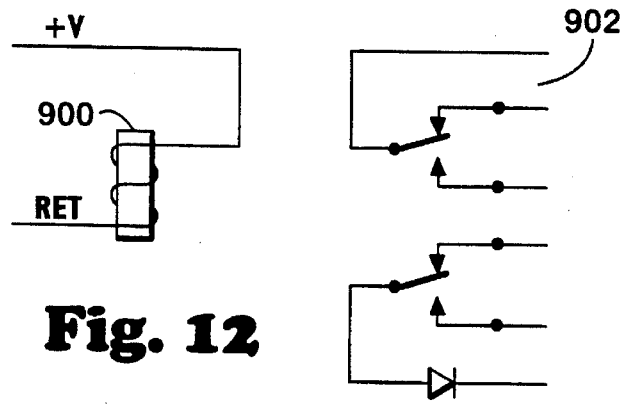
FIG. 12 is a schematic illustration of a typical relay circuit that would be used in conjunction with the circuitry of FIG. 11.

FIG. 12 illustrates how the outputs of these latching decoders would be implemented. A Q output of one of the latching decoders 800–808 is provided as the return line RET to a relay 900, the other side of which is connected to V+. When the Q output connected to the relay 900 goes low, this energizes the relay, causing the outputs to go to an activated state. When the Q output goes high, the relay 900 is deactivated. Using these relays, a variety of external devices can be controlled, such as magnetic door locks and the like.

The touch collector 300 is implemented with circuitry similar to that used to implement the infrared collector 302 as illustrated in FIG. 9. The various channels of the microcontroller 616 are directly connected to the signals provided on the jumper 400 of FIG. 6 for each of the various touch ports. Similarly, the gate of the addressable transistors 314 and 318 are similarly connected to channels of the microcontroller 616. Because the channels of the microcontroller 616 are programmable as inputs or outputs, the touch port 308 can be accessed either by writing to the addressable transistors 416 and 418, or by reading from the touch memory receptor 404.

Passive infrared sensor 316 and relay contacts 320 are then accessed through the addressable transistors 314 and 318 by standard circuitry. The relay contacts 320 are opened and closed using the addressable transistor 318 with circuitry similar to that illustrated in FIG. 6, whereas the passive infrared sensor 316 would have a channel enable to the microcontroller 616 by turning that channel on using the addressable transistor 314, which is connected to the same channel.

It is to be noted that the relay controller 304 does not include addressable transistors, whereas the touch collector 300 does include addressable transistors 416, 418, 314, and 318 to access the passive infrared sensor 316, the relay contacts 320, and the light emitting diodes 408 and 410, as well as the piezoelectric sounder 412 and the touch port 308.

In conjunction with the touch port 308, the SIG-line would be connected to ground within the touch collector circuitry of FIG. 9, whereas the SIG+ line would be connected to the appropriate port of the microcontroller 616. The ports of the microcontroller 616 would appropriately be configured as inputs or outputs depending on whether data was being received from the touch memory receptor 404 or the adjustable transistors 416 or 418, or was being sent to those devices. Thus, 24 touch ports 308 could be connected to a single touch collector.

The concentrator 104 is effectively implemented as an intelligent interface between the Arcnet or Ethernet network and the twisted pairs RS-485 subnetwork. Similar to the controller circuitry illustrated in FIG. 9, and it preferably includes a microcontroller, as well as interface circuitry for both of the networks. Further, preferably includes an RSN chip, such as the RSN chip 628 in FIG. 9.

The Network Layer

Figure 13A:
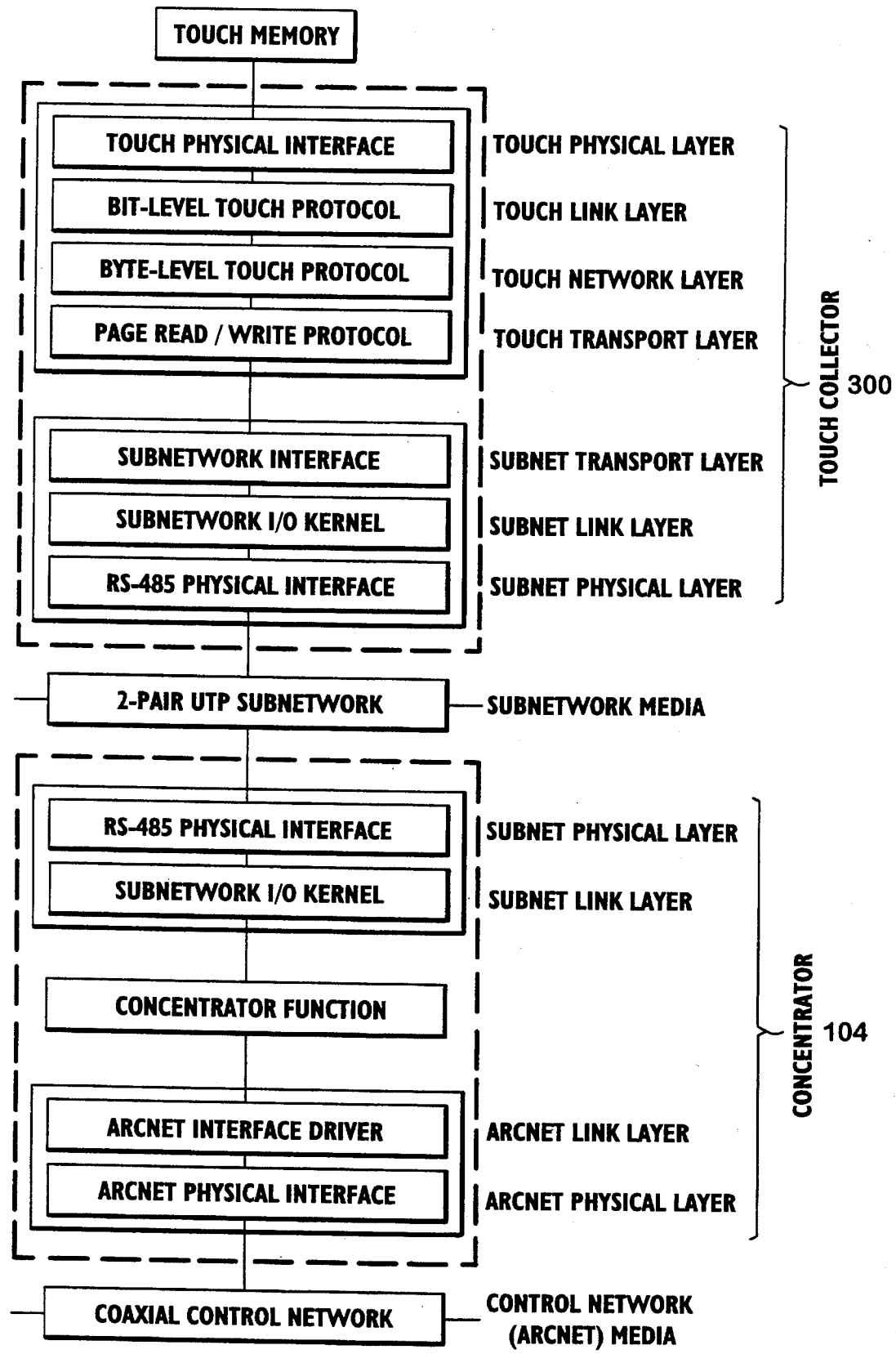
FIGS. 13A and 13B are block diagrams showing typical network layers implemented according to the invention.
Figure 13B:
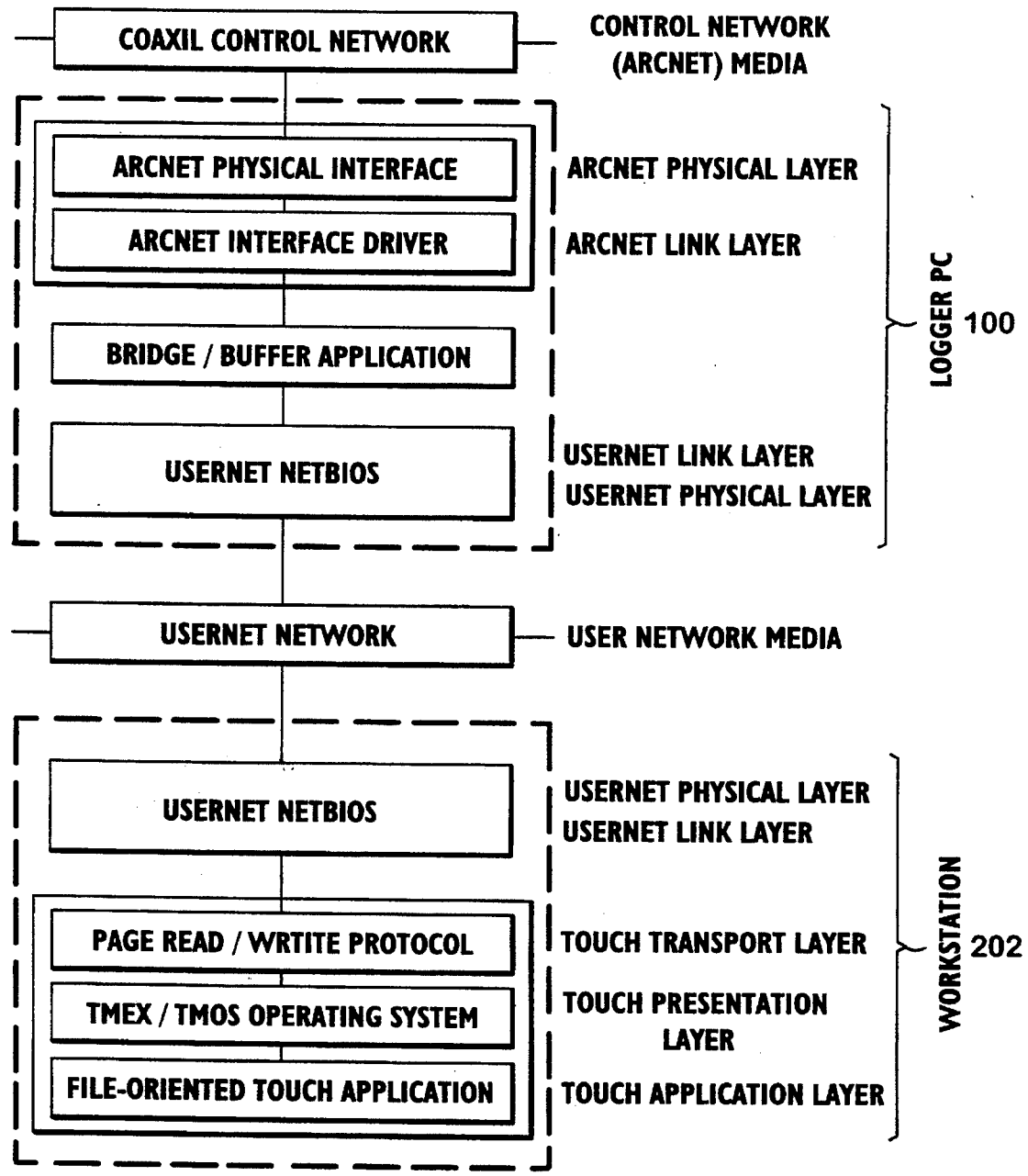

FIG. 13A and 13B illustrate the typical network layers involved in the disclosed embodiment. These are particularly described for a touch collector 300 used in the system illustrated in FIG. 3. The microcontroller 616 within the touch collector 300 preferably implements software containing the following layers. The touch physical interface is accessed by the microcontroller 616 through a bit level touch protocol, a byte level touch protocol, and a page read/write protocol. These protocols are in turn provided to the subnetwork through a subnetwork interface, a subnetwork I/O kernel, and a RS 485 physical interface.

The subnetwork is accessed by the concentrator 104 again through an RS 485 interface, which is accessed via a subnetwork I/O kernel in a microcontroller within the concentrator 104. The microcontroller within the concentrator 104 then provides a network interface, in this case ARCNET, through an ARCNET interface driver and an ARCNET physical interface. The ARCNET network provides messages to or from the concentrator 104 to the logger PC 100. The logger PC 100 again includes an ARCNET physical interface, and its software includes an ARCNET interface driver. A bridge/buffer application is run within the logger PC 100, which then provides Windows based messages through a usernet netbios to the principal network. The workstation 202 can then receive these Windows based messages through its own usernet netbios, via a page read/write protocol, an operating system, and a file-oriented touch application.

SNMP, or simple network management protocol, is a well known network communication protocol based on a variable paradigm. An SNMP server responds to Get, GetNext, and Set messages from a client. In the disclosed embodiment, the concentrator 104 acts as the SNMP server, while the logger PC 100 acts as the client.

The server maintains a management information base (MIB) that defines a set of conceptual variables that the SNMP server must maintain. Sometimes these are actual variables, other times these are parameters generated by performing various functions or, in the disclosed embodiment, received from a controller or collector 300–306.

MIB variables have names, and according to the ISO standard, the standard prefix is "1.3.6.1.2.1". These variable names are transmitted in a numeric form of the ASN.1 format, an ASCII format in which each sublevel of the variable is separated by periods. Because this listed header is always used, it is generally omitted internally by the SNMP server.

In the disclose embodiment, a standard additional prefixes is added, . . . 99, . . . which indicates that the SNP in object identifier variables being accessed are the SNOIDs or subnetwork variables.

Further discussion of SNMP can be found in DOUGLAS E. COMER AND DAVID L. STEVENS, INTERNET-WORKING WITH TCP/IP VOL. 2-DESIGN, IMPLEMENTATION, AND ETERNALS (2D ED. 1994) Chapter 20. SNMP is well known to the data communications art.

In the disclosed embodiment, the subnetwork, through the concentrator 104, appears to the logger PC 100 as the SNMP server. As noted above, SNMP uses a variable paradigm, and its messages provide for getting and setting variables of the system using object identifiers (OIDs). To provide for a uniform interface to the network, the objects on the subnetwork in the disclosed embodiment are identified through subnetwork object identifiers (SNOIDs). These SNOIDs are accessed using standard SNMP protocol.

Software applications on the logger PC 100 use the SNOIDs interface to receive stimuli from the subnetwork based on those stimului. The logger PC 100 then logs, controls, or causes certain actions to take place. The stimuli typically are received messages from the infrared tags 328 and 330 (such as the identification), from the touch memory 312, or from the PIR sensor 316. Using SNOIDs, the logger PC 100 in turn controls such physical devices as the relay contacts 320 and the piezoelectric sounder 412 and the leds 408 and 410.

To the external world, SNOIDS and the subnetwork constitute an SNMP server. The concentrator 104 is accessed directly over a LAN or Wide Area Network (WAN) as an SNMP server. These networks are preferably Ethernet or ARCNET. Client applications communicate with these servers using UDP (a protocol that is part of the TCP/IP suite). An SNMP server manages a block of variables (MIB) whose values clients can access using Get and Set. Variables within the server are addressed via Object IDentifiers (OIDs). An OID is represented as a sequence of decimal numbers seperated by decimal points. The variable-length data that is Get and Set is encoded using ASN.1, a standard encoding format, and can be of several different types. Should the SNMP server encounter an error condition of a general nature or need to report a change of state, a Trap Protocol Data Unit (PDU) is broadcast to the attached network.

SNOIDs are preferrably accessed by applications on the workstations 202–206 and the logger PC 100 through the network and subnetwork using Dynamic Link Library protocol using the Microsoft Window's DLL mechanism. DLL provides not only the ability to receive real-time stimulus events from the subnetwork, but also to access and set the SNOIDs variables contained within the subnetwork itself. The SNOIDS Applications Program Interface (API) provides for transparent access to the subnetwork regardless of the topology of the network between the application and the server.

The DLL handles all of the SNMP protocol specific requirements for communicating with the subnetwork server, including the ASN.1 encoding of any data as well as properly encoding OIDs. The DLL submits the SNMP Set, Get, and GetNext PDUs on behalf of the clients using it. In addition, the DLL provides storage for all incoming PDUs for its subnetwork clients and provides for the translation of this data into Stimuli Reports as well as Tag Reports. Finally SNOIDs handles the posting of appropriate Responses and Traps to the Window's message queues of the tasks using it functions.

Subnetwork OIDs (SNOIDs)

SNOIDs are used to communicate with the subnetwork, making SNOIDs the subnetwork's "language." All system variables of the subnetwork have been given unique OIDs. This is a very rich set of variables that includes such items as ASCII names for every component within the subnetwork as well as firmware revision levels. Even the actual memory of the embedded micro-processors within the concentrators 104 and collectors and controllers 300–306 can be accessed and set; in fact, OIDs are used to download new code to the concentrators 104 and collectors and controllers 300–306.

OIDs and Registered Serial Numbers

All of the components of the subnetwork have within them a Registered Serial Number (RSN) which is guaranteed to be unique. This number is derived primarily from an identification part manufactured by Dallas Semiconductor, but can be derived from any unique source of identifications. The concentrators 104 and collectors and controllers 300–396 can be accessed directly by appending their RSN to an OID. Furthermore, any device in contact with the touch ports 308 and 310 can be accessed and, if appropriate, set via a unique OID. Similarly, the various addressable transistors 314, 318, 416, and 418 are accessed using SNOIDs.

Subnetwork Stimuli Report OIDs

Subnetwork stimuli are stored in a series of eight consecutive OIDs. The set of these OIDs provides a "sliding window" that clients can access by issuing Get requests. If no stimuli data is currently stored in the accessed variable, then the Get's response is delayed until a stimulus arrives from the subnetwork. In addition, an OID is available that has as its value the current OID that is receiving stimuli reports from the subnetwork.

For example, a typical client application desiring all of the stimuli reports from the subnetwork first performs a "logon" to the the server by sending the SNMP Get request (OID 96.0.0.0) to obtain the current stimuli event OID. If the current OID that has the latest stimuli data is 96.0.0.0.3, then this is returned. The client application then issues a request to Get this OID. The SNMP subnetwork server saves the client's request and, when data is available for this OID, passes it back to the client. The client then increments the last number of the OID (the "sliding-window's" sequence number) modulo eight and issues a Get for the next stimuli report (in this example, OID 96.0.0.0.4). Using a timer, the client then periodically checks to make sure that its current stimuli OID value is "in-sync" with the server (by checking the value of OID 96.0.0.0), and if there is a discrepancy, reissuing Gets for any missed sequenced OIDs.

The preceding algorithm is actually implemented within the SNOID's DLL whenever a Get OID of 96.0.0.0 is issued with the GetModifiers set to Continuous and Sequential. After this call is made to the SNOID's API, the task will have posted to its message queue all stimuli events from the subnetwork. Stimuli reports made in this manner are also referred to as "Unsolicited Get Requests."

Whenever multiple responses to a Get request can occur, it is necessary to use the Continuous modifier. Without the use of this modifier, the first response to the request will cause the deletion of the original request from an internal table and any potential subsequent responses from the subnetwork will be discarded. Note that if the subnetwork includes multiple concentrators 104 then it is necessary to send the request as a broadcast by either specifying an IP Address of FF.FF.FF.FF or leaving the IP Address empty (NULL). Using this technique is convenient for finding all of the concentrators 104 that are on a network.

Subnetwork OIDs that Trigger External Events

It is possible to Set specific OIDs within the touch collector 300 that will effect a contact closure. In this way, it is possible to extend the subnetwork to trigger external events, such as the unlocking of a door via the relay 320.

SNOIDs used in the Preferred Embodiement

This section defines Objects in the Management Information Block of the SNMP subnetwork implementation.

A subnetwork Object Identifier is specified in the following manner:

<resource class>.<variable number> [.<index>[.<sequence number>[.<RSN>]]]

Note that the ".96" prefix is added to indicate the SNOIDs MIB is being acessed.

Resource Class

Each resource (collector, etc.) may be assigned a Resource Class that can be used to separate or group resources in the network. A Resource Class value of zero is the general case and is accepted by all resources. Resource class assignments are arbitrary.

Variable Number (value class)

Each subnetwork resource supports variables in three groups. Variables 0,1,2 and 3 are fundamental to all devices and are supported even when the loadable firmware is not functional. Variables 5 through 13 are largely universal among resources. Variables above 13 are resource-specific.

Each subnetwork resource contains a variable which is an array of variable names supported by the device. The symbolic variable names used in this table are shown below under the "symbol" heading.

Array type variables use the value subclass in the OID as an element specifier (array index).

Get operations are issued without values. Set operations require that values be provided. If the values provided do not match the type and length of the destination variable, an error is returned and the Set does not occur (an indirect Set is the sole exception).

Fixed (universal) variables 0,1,2, and 3

The fixed variables are common to all resources and are the only variables that remain valid during firmware downloading. The indirect access variable performs a variable length octet string Set or Get starting at the physical memory address provided in the indirect access pointer variable. Accesses below 0800H will yield invalid results. A Get performed using the indirect variable will return the number of bytes specified by the value subclass. A Set performed in this manner sets the number of bytes provided in the octet string value provided, and the value subclass in the SNOID must match this number or an error will occur.

The following is a description of the different variables and their functions:

---

StimRep { 0 }
Syntax: Sequence of Stimulus
Definition: A set of stimulus reports. Variable
    type 0 will not be issued to a subnetwork
    resource. This variable is reserved for the
    upchannel return of unsolicited stimulus
    reports.
Access: read.
Stimulus { StimRep }
Syntax: Sequence
Definition: Location OID
StimulusId Octet String
Qualifiers Octet String
Access: Read.
Indirect { 1 }
Syntax: Octet String (length variable)
Definition: Indirect Memory Access in Collectors
    and Concentrators
Access: read-write.
MemAddRec { 2 }
Syntax: Integer (length 2)
Definition: Indirect Memory Access Pointer.
/Access: read-write
LoadStatus { 3 }
Syntax: Integer (length 1)
Definition:Download Status.
Access: read-write General Variables 4 through 13

DeviceType { 4 }
Syntax: Printable String (length 25)
Definition: Device type string.
Access: read.
LoadRev { 5 }
Syntax: Printable String (length 15)
Definition: Loader revision/date
Access: read.
DeviceName { 6 }
Syntax: Printable String (length 25)
Definition: Device name string.
Access: read-write.
SystemName { 7 }
Syntax: Printable String (length 25)
Definition: System name string.
Access: read-write.
FirmRev{ 8 }
Syntax: Printable String (length 15)
Definition: Firmware revision/date.
Access: read-write.
RSN { 9 }
Syntax: Octet String (length 8)
Definition: Resource serial number.
Access: read.
NodeID { 10 }
Syntax: Integer (length 1)
Definition: Subnetnode id.
Access: read.
UserNumber { 11 }
Syntax: Printable String (length 25)
Definition: User assigned information.
Access: read-write.
VarTable { 12 }

Syntax: Sequence VarName
Definition: Variable name table.
Access: read.
VarName { VarTable, 0 }
Syntax: Printable String (length 15)
Definition: Variable name.
Access: read.

Subnetwork Specific Variables

MaxNodeID { 16 }
Syntax: Integer (length 1)
Definition: Maximum resource node ID.
Access: read.
RSNTable { 17 }
Syntax: Sequence of RSNEntry
Definition: Resource serial number table.
Access: read.
RSNEntry { 0 }
Syntax: Octet String (length 8)
Definition: Resource serial number.
Access: read.
MsgNoNode { 18 }
Syntax: Printable String (length 25)
Definition: Message for "No Collectors Found"
Access: read.
MsgNodLost { 19 }
Syntax: Printable String (length 25)
Definition: Message for "Node Lost"
Access: read.
ArcnetNode { 20 }
Syntax: Integer (length 1)
Definition: Subserver node number.
Access: read-write.

Collector Specific Variables

MaxNodeID { 16 }
Syntax: Integer (length 1)
Definition: Maximum resource node ID.
Access: read.
RSNTable { 17 }
Syntax: Sequence RSNEntry
Definition: Resource serial number table.
Access: read.
RSNEntry { 0 }
Syntax: Octet String (length 8)
Definition: Resource serial number.
Access: read.
MsgNoNode { 18 }
Syntax: Printable String (length 25)
Definition: Message for "No Collectors Found"
Access: read.
MsgNodLost { 19 }
Syntax: Printable String (length 25)
Definition: Message for "Node Lost"
Access: read.

Infrared Collector Specific Variables

SensNameTable { 14 }
Syntax: Sequence (elements 128)
Definition: Table for Sensor names.
Access: read-write.
SensName { SensNameTable n }
Syntax: Printable String (length 25)
Definition: sensor name.
Access: read-write.
SensClassTable { 15 }
Syntax: Sequence (elements 128)
Definition: Sensor class table
Access: read-write.
SensClass { SensClassTable n }
Syntax: Integer (length 1)
Definition: Sensor Class
Access: read-write.
DemodOR { 16 }
Syntax: Integer (length 2)
Definition: Demod overrun count.
Access: read-write.
ShortCnt { 17 }
Syntax: Integer (length 2)
Definition: Short bit error count.
Access: read-write.
LongCnt { 18 }
Syntax: Integer (length 2)
Definition: Long bit error count.
Access: read-write.
StartCnt { 19 }
Syntax: Integer (length 2)
Definition: Long bit error count.
Access: read-write.
ParErrCnt { 20 }
Syntax: Integer (length 2)
Definition: Parity bit error count.
Access: read-write.
AuxErrCnt { 21 }
Syntax: Integer (length 2)
Definition: Auxilliary bits error count.
Access: read-write.
CRCErrCnt { 22 }
Syntax: Integer (length 2)
Definition: CRC error count.
Access: read-write.
NibErrCnt { 23 }
Syntax: Integer (length 2)
Definition: Check nibble error count.
Access: read-write.
LenErrCnt { 24 }
Syntax: Integer (length 2)
Definition: Bad message length count.
Access: read-write.
OvrErrCnt { 25 }
Syntax: Integer (length 2)
Definition: Buffer overflow count.
Access: read-write.
TMAErrcnt { 26 }
Syntax: Integer (length 2)
Definition: TMA (Ack) failure count.
Access: read-write.

Touch Collector and Relay Controller Specific Variables

BeepPort { 16 }
Syntax: Integer (length 1)
Definition: Port number to Beep. The port BLINK
    and BEEP variables are normally set to OFF
    (hex) by the collector. When one of these
    variables is set to a port number (1–24), the
    BEEP or BLINK devices associated with that
    port are activated momentarily, after which
    the variable value is returned to OFF (hex).
Access: read-write.
BlinkPort { 17 }
Syntax: Integer (length 1)
Definition: Port number to Blink. See description
    of BeepPort for more information.
Access: read-write.
TAWOTMA { 18 }
Syntax: Integer (length 2)
Definition: Ack failure count.
Access: read-write.
OpenDoor { 19 }
Syntax: Integer (length 2)
Definition: Port number to pulse. This variable is
    used in access control developement.
Access: read-write.
TimEvTable { 20 }
Syntax: Octet String (length 11)
Definition: Timed event table. This variable is
    used in access control developement.
Access: read-write.
LastRSN { 21 }
Syntax: Octet String (length 8)
Definition: Last arrived RSN. This variable is
    used in access control developement.
Access: read.

Error Codes

| Value: | Symbol: | Meaning: |
|---|---|---|
| 01 | Err_TooLong | OID length excessive |
| 02 | Err_NoOid | OID not valid for this device |
| 03 | Err_BadVal | Value bad or missing value |

-continued

| 04 | Err_BadOid | Malformed OID header or NetClass<>Servant Net |
| 05 | Err_UnLoad | No valid program loaded |
| 06 | Err_NotForMe | Message to my Node ID not for me |
| 07 | Err_MultiZer | Multi element array index invalid (zero, too large) |
| 08 | Err_PDUType | PDU type is not SET or GET |
| 09 | Err_VType | Bad variable type in SET |
| 0A | Err_VLen | Bad variable length in SET |
| 0B | Err_IndLen | Indirect variable length = 0 in SET |
| 0C | Err_ReadOnly | Attempt to SET a read-only variable |

Programming at the Network Layer

Programming Environments for SNOIDs

If the application is run under the Microsoft Windows 3.1 operating system then there is a rich set of development tools available to both Visual Basic programmers and C/C++ programmers through the use of the SNOIDs DLL and VB custom controls.

If the software platform of the client is not Microsoft Windows or an interface that allows Remote Program Calling, then a programming aid for obtaining subnetwork information over a TCP/IP network are the list of OIDs supported by the subnetwork. By sending correctly formatted SNMP requests to the subnetwork server using UDP ports, however, full access to its data can be achieved.

In addition a suite of files are preferably maintained by the subnetwork information processing system in the logger PC 100. A typical application is found in U.S. patent application Ser. No. 08/118,566, filed Sep. 9, 1993, entitled "Method and Apparatus for Locating Personnel and Objects in Response to Telephone Inquiries," which is hereby incorporated by reference.

Programming SNOIDs in a Window's Visual Basic Environment

In order to make stimuli easily available for Visual Basic (VB) programmers, custom controls can be developed. These controls invoke the SNOIDS DLL, so that the VB programmer has a protocol that correctly parameterizes calls to the SNOIDS API and posts messages from the subnetwork onto the appropriate VB message queue. These messages in turn trigger Visual Basic events. By adding these controls to a VB application and including it in a "form," the application will have access to the capabilities of the SNOID's DLL.

The STI custom control would give the user full access to all stimuli events of the subnetwork. Upon activation of any form that contains a STI control, communications are set up through the SNOIDS DLL for posting all stimuli received from the subnetwork to the VB program. For example, stimuli could be received via a form's event titled StimulusReport for the STI control.

StimulusReport Event

The reception of a stimulus event could parameterized as follows:

```
Sub Stimulus1_StimulusReport (Channel As
String, CollectorID As String, IpAddr As
String, StimulusId As String, ReceptorClass As
String, Qualifiers As String) EndSub
```

Channel and CollectorId parameters are the unique collector or controller 300–306 and channel that define the receptor reporting the event.

IPAddress is the IP address of the concentrator 104 connected to the subnetwork that has reported the event.

StimulusId is the unique id of the stimulus.

ReceptorClass is the class of the receptor that has detected this event.

Qualifiers are stimulus dependent additional information that is associated with the event. In the case of infrared tag reports, this information includes the state of the tag's battery, its motion switch and its current "TCOUNT."

Visual Basic Custom Control for SNOIDs.

The SNOID custom control would provide the application with the ability to generate an SNMP request to the subnetwork server and receive its response. Once the control is "dropped-onto" a VB form, an SNMP request would be sent out anytime the PDUType property is modified. This action will take place during either design- or run-time. In addition, during run-time, a SNOID response event would be triggered when the response is returned from the SNMP server for the request. During design time, the VB programmer would be notified that the request has been successfully completed by the fact that the PDUType property will change to Response.

SNOID Properties

The following are the special properties that would be asscociated with SNOID control.

Error Types

Returned from DLL

This is an enumerated property that reflects the Error Type returned for a SNMP request. Normally this value will be either OK or User-Defined. If User-Defined is returned then the Error Value property contains the specific error.

Error Values

Returned from DLL

This property reflects the specific error for a SNMP request. It is only valid if the Error Type is not OK. It is enumerated.

Get Modifiers

Set by programmer

This enumerated field consists of a combination of four possible modifiers for any SNMP Get request. These modifiers qualify how the SNOID's DLL interprets the SNMP Get request in the following manners:

Continuous—issues the Get request and initiates another Get request upon reception of the first request's response. This process will continue until the DLL or the task that commences the original Get terminates.

Sequential—used in conjunction with the "96.0.0.0.x" Stimuli Report OID. This modifier will increment the value of "x" modulo the size of the stimuli report "sliding-window" (8) each time it receives a response.

Polled—broadcast the Get every five seconds and continues this until the DLL or the task that commences this Get terminates.

Note that the use of Sequential and Polled modifiers are only supported for the particular OID 96.0.0.0; use of these modifiers in other OID Get requests is not defined. The Continuous modifier is useful in "Broadcast" requests and is supported for all OID values.

IPAddress

Set by programmer/Returned from DLL

Twelve hexi-decimal digit string representing the IPAddress of the SNMP server. Setting a null value is interpreted to be a broadcast ("ff ff ff ff"). Notice that all hex strings are represented by groups of two hex digits followed by a space, for example SNOID.IPAddress="01 0a 03 0c". Hex digits are comprised from 0–9 and A–F (or a–f).

OID

Set by programmer/Returned from VBX when OID Hex changes (below)

This property is a string composed of dot seperated decimal digit sequences that composes the OID for the SNMP Get request. Note that the standard SNMP preamble of "1.3.6.1.2.1" is automatically prefixed to any string entered here, so it must not be included. Also, all subnetwork specific SNOIDs start with 96. For example, to query a Concentrator as to its DeviceName, the OID would be "96.0.6.0.0".

OIDHex

Set by programmer

Whenever the programmer enters a hexi-decimal digit string into this property, the OID property is changed to reflect the ASN.1 decimal equivalent. Using this property allows translation of an RSN into ASN.1 decimal equivalent form. Note that this action occurs only if the OID property is cleared prior to the setting of the OIDHex property.

PDUType: Set by programmer/Returned by DLL

The setting of this enumerated property to Get, GetNext, or Set triggers the sending of the SNMP request. The return of the response will be reflected by the PDUType being changed to Response.

Value

Set by programmer for Set/Returned by DLL for Get and GetNext

This property is a string that reflects the value for an OID. For Get requests, the property is valid when the response returns. For Set requests, the value of the OID within the SNMP will be changed to the value entered here. Note that the form of this value is dependent on the ValueType for the OID. Also, the DLL will provide the ASN.1 encoding/decoding of this value within the SNMP request/response.

ValueHex

Set by programmer for Set/Returned by DLL for Get and GetNext

If the Value property is empty, then the hexi-decimal digit string entered here will be used for the value of a Set request. Upon reception of a response, this property is set to the hex string equivalent of the Value property.

ValueType

Set by programmer for Set/Returned by DLL for Get and GetNext

This enumerated property is the ASN.1 value type for the value property.

SNOIDResponse Event

During runtime, a SNOIDResponse event is invoked whenever a response for-a Set, Get, or GetNext OID that had been issued previously by the VB application is received by the SNOID's DLL. All properties that are set by the control are valid and can be interrogated and acted upon at this time.

SnPollOid External Procedure

When the SNOIDs DLL is used with an ARCNET card or IOCard, the hardware must be polled to receive incoming messages. Normally this is done via a timer from within SNOIDs automatically. If the user wishes to control the polling of the hardware, then insertion of this call will provide this functionality.

The SNOID's DLL can be accessed via call to the API as outlined in SNOIDAPI.H, attached as Appendix 1. The functions provided allow clients to send and receive SNMP messages in the PDU store. One of ordinary skill in programming for Microsoft Windows' message queues will understand how to program this API.

SNMP Set, Get, and GetNext can be sent through the SNOID's DLL using the snSetOid, snGetOid and snNextOid functions, respectively. SNOIDAPI.H shows the actual parameters for the IPAddress, OID and Values. The Responses for these calls will be returned on the Window's message queue.

Reception of an SNMP Response or Trap is detected through a message in the Window's message queue as events WM_SNOIDRESP and WM_SNOIDTRAP, respectively. The LPARAM is a handle into the PDU store of the object received. The SPARAM is a sequence number so that any "wrap" of the PDU store can be detected Should the processing of the message not occur before the data is invalidated by subsequent incoming messages. Both LPARAM and SPARAM are returned by any call accessing the data within the PDU store.

Properties of the PDU Objects

The values for these properties can be obtained by calling the appropriate routine of the API with the objects handle and sequence number. Any of these functions will return FALSE if an invalid handle or sequence number are detected. The following is a list of the properties.

PDUType: Accessed by snWotPduType

IPAddress: Accessed by snWotIPAddr

OID: Accessed by snWotOid and snWotRawOid

ValueType: Accessed by snWotValType

Value: Accessed by snWotVal

ErrorType: Accessed by snWotErr

ErrorValue: Accessed by snWotErrX Processing Functions SnPduAck

SnPduAck is provided to let the PDU store know that the application has processed this message. Note that objects within the PDU will be invalidated even though they have not been fully acknowledged.

SnTagRep and SnStimulusReport

These functions provide an ability to extract the data from the value of a Stimuli Report OID (96.0.0.0.x). These functions should be called repeatedly initially with the which parameter set to zero as multiple Stimulus Reports could be contained within a PDU. When the which parameter is greater than or equal to the number of Stimuli Reports within a PDU, the function will return FALSE.

SnPollOid

When hardware that connects the SNOID's computer with the subnetwork needs to be polled to function correctly, then the snPollOid routine should be called within the Window's main loop. Please see the section in the Visual Basic section on this topic for more information.

The Subnetwork

Physical layer

The physical layer of the subnetwork is preferably twisted pair to RS-485 drivers that are tri-stated for multi-drop configurations.

Data Link Layer

A single binary data element (bit) is defined as a period of four microseconds during which the state of the data pair remains constant at either a logical zero or logical one potential difference. The differential voltage of the data pair reflects the value of the binary data element in that the pair idles in a marking (one) state and is driven to the spacing (zero) state.

A single symbol consists of eleven bits in sequence, the first always being a logical zero state (start bit). The second through ninth bit periods are eight binary bits in order, least significant first, of the symbol value. The tenth bit period is a control state used to cause selected symbols to invoke receiver interrupts, called an Alert Flag bit. The eleventh (final) bit period is a logical one state (stop bit). A single symbol has a time period of 44 microseconds (11*4 usec).

System messages consist of symbols or groups of symbols which have meanings in the system control protocol. Multi-symbol messages are made up of symbols with less than 100 micro-seconds between the first symbol stop bit and subsequent symbol start bit.

The alert flag bit may be set to the true state in the leading symbol of selected messages, but not in any other symbols of the message.

A data packet may consist of between 11 and 259 symbols which have no more than 100 microseconds between any symbol stop bit and the subsequent symbol start bit. The alert flag bit is set to the true state in the leading symbol of every data packet, but not in any other symbols of the packet.

Subnetwork Layer

The concentrator 104 controls the exchange of information on the subnetwork through the use of special messages which direct the subservient nodes in their use of the media.

To move data between applications, which are serial number oriented, and the subnetwork nodes, which are node number oriented, the concentrator 104 maintains a list of serial numbers present on the subnetwork and the nodes that those serial numbers each occupy.

Although the disclosed subnetwork operates using polling, one could easily implement another non-polled technique, such as CSMA (collision sense multiple access). The same holds true for the network layer.

| Subnetwork Packet Types and Functions Invitation To Transmit (ITT) | | | |
|---|---|---|---|
| Offset: | Len: | Name: | Function: |
| 0 | 1 | DID* | Destination ID (1 < DID < 255) |
| 1 | 1 | SID | Source ID = 0 |

Note:
*indicates that interrupt flag is set on this symbol.

The Invitation To Transmit message can only be issued by the concentrator 104 device. It is comprised of a symbol, which is the number of the node being invited to transmit, followed by a symbol which is always zero.

When a subnetwork node receives an Invitation To Transmit in which the leading symbol equals its node number, that node is enabled. An enabled node will remain so until it issues a Pass message (see below), or until 800 microseconds pass during which there is no transmission or reception of symbols by the node.

When a node has been enabled, it may transmit a data packet to any other node. An enabled node which has transmitted a data packet must now wait up to 800 microseconds for an acknowledgment response from the destination node. If no response is observed, the node will issue the Pass message and leave the enabled mode, assuming an unsuccessful data transmission has occurred.

If an enabled node observes any other data transaction on the network other than an appropriate acknowledgment message after sending a data packet, it will leave the enabled mode immediately and issue no further transmissions.

| Pass | | | |
|---|---|---|---|
| Offset: | Len: | Name: | Function: |
| 0 | 1 | DID | Destination ID = 0 |

The Pass message may only be issued by a node which has been enabled by receiving an Invitation To Transmit, and which remains enabled. This message is used by an enabled node to signal to the concentrator 104 that it has completed network data transactions and is no longer enabled. This message consists of a leading symbol which has a value of zero.

An enabled node with data to transmit will perform the data transmission and then issue a Pass message. An enabled node with nothing to transmit will issue a Pass message immediately. In either case, the Pass message must be issued within 800 microseconds of the node being enabled or the end of the last data transmission generated or observed by the node.

| Invitation To Join (ITJ) | | | |
|---|---|---|---|
| Offset: | Len: | Name: | Function: |
| 0 | 1 | DID* | Destination ID = 255 |
| 1 | 1 | SID | Source ID = 0 |

Note:
*indicates that interrupt flag is set on this symbol.

The Invitation To Join message may only be issued by the concentrator 104. It is comprised of a symbol with the value of 255 (decimal) followed by a symbol with the value zero. The alert flag is set to true in this message. This message is used to invite any nodes that have been omitted from the polling sequence to signal the concentrator 104 if they wish to join the polling sequence.

Any node which receives two ITJ messages without being enabled one or more times between them must assume that it has been omitted from the polling.

| Acknowledgement (ACK) | | | |
|---|---|---|---|
| Offset: | Len: | Name: | Function: |
| 0 | 1 | ACK | Issuer node number (1 < ACK < 255) |

The Acknowledgment message (ACK) is issued by a node which has received a data packet to signal that the packet has been received without error. This message is comprised of a leading symbol which has a value of the node number of the recipient resource.

Data Packets

Data is transferred between nodes using a data packet structure as follows:

| Offset: | Len: | Name: | Function: |
|---|---|---|---|
| 0 | 1 | DID* | Destination ID (0 < DID) |
| 1 | 1 | SID | Source ID (0 < SID < 255) |
| 2 | 1 | COUNT | Count (0–255, 0 = 256 data bytes) |
| 3 | 1 | PSN | Packet Sequence Number |
| 4 | 1–256 | DATA | Application data area |
| 5–260 | 1 | CRC | Error control |

Note:
*indicates that interrupt flag is set on this symbol.

The CRC value is generated by performing an XOR against each data byte of the message and then a single left shift of the result. The initialization value is zero.

Node Search Mode Command

The Node Search mode is invoked in the subnetwork using the Search Mode Command message. Any node receiving this command will enter the Node Search mode.

| Offset: | Len: | Name: | Function: |
|---|---|---|---|
| 0 | 1 | DID* | Destination ID = 255 (Broadcast) |
| 1 | 1 | SID | Source ID = 255 (Special Code) |

This command message may be issued more than once to insure that all nodes enter the Node Search mode.

Node Search Message

The Node Search Message is an exception to normal network formats and is used during the special node search mode, in which nodes are identified and provided node numbers. The search mode message is a single symbol formatted as follows:

| Offset: | Len: | Name: | Function: |
|---|---|---|---|
| 0 | 1 | SRCH | Search Message Code |
| | | 0–47 = | Test Bit 0 thru 47 |
| | | 65 = | Select All (Reset) |
| | | 66 = | Select Ones |
| | | 68 = | Load Node ID (followed by node ID, then complement of node ID) |
| | | 72 = | Test All |
| | | 80 = | Match Report |

The interrupt flag bit is not set in these messages. If a node receives a character in which the interrupt flag is Set, the node will abort the Node Search mode.

Polling of Nodes The concentrator 104 polls the subnetwork. It maintains a count of the number of assigned node numbers in a subnetwork and polls those nodes in sequence.

Subnetwork Changes and New Nodes

About once per second, an Invitation To Join message is issued by the concentrator 104 allowing any network node to signal that node numbers must be reassigned. If any node causes sufficient network activity during this interval, the concentrator 104 will perform a Node Search operation and re-establish (and possibly reassign) the network node numbers.

Addition of Nodes

If a new node is added to the subnetwork, it will not have a valid node number and will not be polled. To correct this, a new node may signal the need for a subnetwork Node Search action. The concentrator 104 issues a periodic Invitation To Join signal. Any node wishing to enter the polling will transmit data in response to this message. If this message gets a response on a number of consecutive ITJ's, the concentrator 104 will perform a Node Search.

Node devices find themselves conflicting with other nodes.

Data Exchange

A data packet includes between 6 and 261 symbols. The first symbol is the destination node number (DID). The second symbol is the source node number (SID). The third symbol is the count of symbols in the rest of the message, excluding the final symbol. The fourth symbol is the Packet Sequence Number. The final symbol is a cyclic redundancy check generated from all of the previous packet symbols.

When a node is polled it may transmit a data packet to any other valid network node. The destination node will recognize the node number in the packet header and attempt to receive it. If the data packet is received intact and error free, the recipient node issues an ACK message within 800 microseconds. On receiving of the ACK message, the sending node issues a Pass message, having completed the data packet transaction.

A data packet transmission error can result from data errors, inadequate buffer space in the receiver, or a destination node that does not exist. Any data packet error causes the packet to be ignored and no response to be generated.

The Packet Sequence Number protects against the reception of multiple copies of the same packet should an acknowledgement to not be properly received. This field contains a number that is one greater than the last number transmitted by a node to a node. A zero in this position causes the packet to always be accepted, for example when the proper sequence number is unknown. For example, the first packet sent from one node to another should use sequence number zero. This assures acceptance of the packet and also sets the receiver sequence number check to zero. Subsequent packets then use the next sequence number. The receiver thus must maintain seperate sequence numbers for each node that sends it a message. If the receiver cannot maintain such a list, it should ignore sequence numbers. Likewise, a transmitting device must retain seperate seqeunce numbers for all nodes to which it will transmit. If unable to do so, the transmitter should instead issue zero value sequence numbers to ensure packet acceptance.

Node Search Algorithm

The Node Search method fills a table with Serial Numbers of nodes located. Each subnetwork node is placed into the Node Search mode by a special system message. In this mode, all background processing stops.

When a node device receives a Bit Test (n) command, if it has not been de selected, it will test the (n)th bit of its hardware serial number. If the bit tested is a "1," this node will issue a response byte onto the network and set a response flag. If the bit is a zero, this node will perform no network transmission, and clear the response flag.

When a node device receives a Select Ones command, it examines the response flag and deselects itself if the flag is false.

When a node device receives a Select All command, it re-selects itself and will then respond to Bit Test (n) commands.

When a node device receives a Node Load command, it accepts the following byte as a new node ID and then validates that byte with the next byte that comes in, expecting it to be the complement of the node ID. If the new node ID checks out, this node device leaves the Node Search mode and waits for normal polling, ignoring all Search Node messages thereafter.

When a node device receives a Test All command, it transmits a signal on the network to indicate that it is still in the Search Node mode.

Logger PC and Workstation Applications Data Format

In use, the logger PC 100 typically runs an application that keeps track of TAGs and touch memories. For example, a typical log file contains 22-byte binary records as follows:

| (TIM) | = | Time-of-day | 4-Bytes |
|---|---|---|---|
| (01) | = | Constant.Value (Serial # type code) | 1-Byte |
| (CSN) | = | Collector (Resource) Serial Number | 6-Bytes |
| (PPN) | = | Physical Port Number | 1-Byte |
| (CAT) | = | Category Code | 1-Byte |
| (EVT) | = | Event Code | 1-Byte |
| (REG) | = | Touch Memory Registration Number | 8-Bytes |
| | | | 22-Bytes |

The (REG) field is further defined as:

| (TYP) | = | Touch Memory Device Type | 1-Byte |
|---|---|---|---|
| (RSN) | = | Device Serial Number | 6-Bytes |
| (CRC) | = | Registration Num CRC Check Byte | 1-Byte |
| | | | 8-Bytes |

To use a common database for touch ports and touch memory devices, the eight-byte (REG) field is interchangeable with the (01) (CSN) (PPN) field (also 8 bytes) to describe a unique Touch Port (MicroLan) location.

Category Codes

Because multiple applications programs may access the subnetwork, messages can be assigned to one or more categories depending on their function. Application programs then act on messages in one or more categories and ignore messages in other categories.

The category code is an eight bit binary value with each bit representing a category. The system administrator defines each category. When a resource (such as the touch collector 300) is provided a mission, it is also provided a category for messages that it might receive or transmit. Likewise, an application is assigned one or more categories and then processes only the messages in those categories. When any system resource or application transmits a message with a specific category mask, that message is received and acted upon only by those resources or applications that have at least one matching category bit. An all-zero category value indicates a special case and should be ignored by all normal, missioned devices. An all-ones category value, as would be expected, is accepted by all devices.

Touch collectors 300 retain a category mask per-port, allowing ports on the same touch collector 300 to have different uses (categories) in a system.

Each application program is provided a category mask through an initialization data file. Each downchannel resource (collector) is provided a category code as a part of the process of port/sensor definition.

For example, the system administrator defines category 1 for touch memory reports, category 2 for IR tracking reports, category 3 for access control reports, category 4 for HVAC controls, and category 5 for security.

The touch collector 300 has four touch ports 308 at controlled doorways, which are missioned to be category 3 (access control), category 1 (touch tracking), and category 2 (IR tracking). Two of the touch collector 300 ports are connected to HVAC temperature sensors, so they are missioned as category 4. Another group of ports are used for guard tour and other security applications, and so are in category 5. The remaining ports are touch memory terminals within the facility and are category 1 and category 2.

An access control application is programmed to respond to category 3 messages. An IR tracking system logger application responds to category 2 messages, a touch logger application responds to category 1, and an HVAC control application responds to category 4 messages.

When a touch memory device 312 is inserted into a touch port 310, the message is issued as categories 1,2, and 3. The Access Control application then responds to the message and, perhaps, unlocks the door. Likewise, the touch tracking application logs the arrival and departure of the touch memory 312, and the IR tracking application logs a position report.

Temperature change on the HVAC sensing port, however, sends a message in only category 4, so only the HVAC control application responds and perhaps starts or stops a cooling or heating system.

Guard tour activity is missioned to perform category 5 and also category 2 for general tracking of the security staff. Guard tour reports might also include category 3 where the station is near an area that requires a controlled access entry by the guard on rounds.

Event Codes

Typical event code definitions are listed below. The return status code (RSC) for a given command is the same code as the command which instigated the response.

| | Touch Memory (TMEX) Low Level Group: |
|---|---|
| 00 | TMEX: Setup |
| 01 | TMEX: Touch Reset |
| 02 | TMEX: Touch Byte |
| 03 | TMEX: Touch Bit |
| 04 | TMEX: First |
| 05 | TMEX: Next |
| 06 | TMEX: Access |
| 07 | TMEX: Romdata |
| 08 | TMEX: FirstAlarm |
| 09 | TMEX: NextAlarm |
| 0A | TMEX: Read Packet |
| 0B | TMEX: Write packet |
| 0C | TMEX: Block I/O |
| 0F | TMEX: Close |
| | Touch Memory (TMEX) File Group: |
| 21 | TMEX: Find First File |
| 22 | TMEX: Find Next File |
| 23 | TMEX: Open File |
| 24 | TMEX: Create File |
| 25 | TMEX: Close File |
| 26 | TMEX: Read File |
| 27 | TMEX: Write File |
| 28 | TMEX: Delete File |
| 29 | TMEX: Format Touch Memory |
| 2A | TMEX: Set Attributes |
| | Missioned Touch Tracking-Group: |
| 40 | Touch Memory Contact (Includes CSN/PPN, REG, CAT) |
| 41 | Touch Memory Arrival (Includes CSN/PPN, REG, CAT) |
| 42 | Touch Memory Departure (Includes CSN/PPN, REG, CAT) |
| | Missioned Infrared Tracking Group: |
| A1 | IR Tag Report (w/o coordinates) |
| A2 | IR Tag Report (w/coordinates) |
| A3 | Coordinate Read (by CSN/PPN where PPN = sensor mask) |
| A4 | Coordinate Write (by CSN/PPN where PPN = sensor mask) |
| | System Control/Assignment Group: |
| F1 | Read Mission (by CSN/PPN) |
| F2 | Write Mission (by CSN/PPN, Includes spec, parms, cat) |
| F3 | Down line Load Mode Control / Data Packet |
| FC | Resource Wakeup Message |
| FD | Departing Resource Report |
| FE | Arriving Resource Report |
| FF | System Error Reports |

When an application receives a message in the appropriate category, it logs or otherwise acts on the data it contains. Some applications use the same packet formats. For example, a door access control application might be able to recognize Touch Memory Arrival messages and also IR Tracking Tag Report messages. Note that a unique location is a CSN/PPN in either system, as the IR method places the sensor "mask" (effective sensor number) in the PPN position even when coordinate reports are used.

System control Message Formats

System control messages are-common to all subnetwork resources. They are used to report subnetwork errors, perform program downloads and diagnostics, and for general network maintenance.

System messages are generally issued with a zero (override) sequence number.

System Message: DownLoad Control

The DownLoad Control message is used to start, process, and complete a download of program code to a resource. The (PPN) field is used to indicate the start of a download operation (00), a download data block (01), and the end of a download operation (02).

Download operations begin when the concentrator 104 delivers a directed DownLoad Start message (PPN=00) to a resource. The resource suspends all operations, invalidates its current loadable code, and waits for download data. During this time, all other messages are ignored. The DownLoad Start message is formed as follows:

| (PPN) | = | 1-Byte (=00) |
|---|---|---|
| (CAT) | = | 1-Byte category (=0FFH) |
| (EVT) | = | 1-Byte (= 0F3H) |
| (LEN) | = | 1-Byte data length count = 0 |

To prevent an error from invoking a download start action, all the parameters are checked and must be as defined above.

Download data is issued in DownLoad Data messages, formatted as follows:

| (PPN) | = | 1-Byte (=01) |
|---|---|---|
| (CAT) | = | 1-Byte category (=0FFH) |
| (EVT) | = | 1-Byte (= 0F3H) |
| (LEN) | = | 1-Byte data length count = (n) |
| (LAL) | = | 1-Byte Load Address LSP |
| (LAH) | = | 1-Byte Load Address MSP |
| (data) | = | (n-2) Data Bytes |
| (DCS) | = | DownLoad Check (Mod 256 Sum of all n data bytes, LAL, LAH) |

When the download is completed, a final DownLoad End message is issued, formed as follows:

| (PPN) | = | 1-Byte (=02) |
|---|---|---|
| (CAT) | = | 1-Byte category (=0FFH) |
| (EVT) | = | 1-Byte (= 0F3H) |

System Message: Resource Wakeup

The Wakeup system message is used by a device on power-up to report that it is present and active in the system.

A system message can only be issued by operational downloaded program code, and is issued on completion of a download when the downloaded code is executed. For this reason, the Wakeup message is an indication of a successful download operation.

The WakeUp message also contains the device serial number, allowing the concentrator 104 to see if the device is new to the subnetwork and, if so, to invoke a renumbering of the network nodes.

| (PPN) | = | 1-Byte sensor mask (Always 0) |
|---|---|---|
| (CAT) | = | 1-Byte category (always 0FFH) |
| (EVT) | = | 1-Byte = 0FC(hex) event code |
| (LEN) | = | 1-Byte data length count = 6 |
| (RSN) | = | 6-Byte Resource Serial Number |

System Message: System Error Report

The Error Report system message is used when a device has sustained an error of sufficient magnitude that it must be known to the concentrator immediately. Error report messages contain a data field in which the first byte is an error code, defined as follows:

| 00 | Undefined Error Conditions |
|---|---|
| 1x | Subnetwork Communications Errors |
| 2x | Download Progress Errors (data, sequence, etc.) |
| 3x | Initialization Errors (RAM test, ROM test, hardware tests, etc.) |
| 4x | Configuration Errors (user configuration) |

Infrared Tracking System Message Formats

Messages used by the fixed-mission IR tracking Collectors may be unmapped types which contain coded location data, or mapped types which report tag locations in X,Y,Z terms.

The unmapped tag report message is formed as follows:

| (PPN) | = | 1-Byte sensor mask |
|---|---|---|
| (CAT) | = | 1-Byte category (as missioned) |
| (EVT) | = | 1-Byte = 0A1(hex) event code for un-mapped IR tag reports |
| (LEN) | = | 1-Byte data length count = 4 |
| (TAG) | = | 3-Byte tag ID (LSB first) |
| (TST) | = | 1 - Byte tag state (TCNT+S0+S1+M+B) |

The mapped tag report message is formed as follows:

| (PPN) | = | 1-Byte sensor mask (included for non-mapped applications) |
|---|---|---|
| (CAT) | = | 1-Byte category (as missioned) |
| (EVT) | = | 1-Byte = 0A2(hex) event code for mapped IR tag reports |
| (LEN) | = | 1-Byte data length count = 10 |
| (TAG) | = | 3-Byte tag ID (LSB first) |
| (TST) | = | 1 - Byte tag state (TCNT+S0+S1+M+B) |
| (LCX) | = | 2-Byte 'X' location coordinate |
| (LCY) | = | 2-Byte 'Y' location coordinate |
| (LCZ) | = | 2-Byte 'Z' location coordinate |

Tag locations are mapped using a coordinate table stored in the Collector non-volatile RAM area. For each valid sensor mask combination, three 2-byte coordinates and a category byte are stored. (Translating IR collectors can have different categories for each sensor position or overlap combination.)

Touch Memory System Message Formats

Touch memory event logging (missioned functions) use a packet format as follows:

| (PPN) | = | 1-Byte Physical Port Number (1–24) |
|---|---|---|
| (CAT) | = | 1-Byte category (as missioned) |
| (EVT) | = | 1-Byte = 04x (hex) event code for Touch Reports (40,41,42) |
| (LEN) | = | 1-Byte data length count = 8 |
| (REG) | = | 8-Byte Registration Number of device |

Use of Subnetwork OIDs in a Tracking and Location System

To illustrate the operation of the tracking system using a network and subnetwork, two examples will be discussed. First, the system response to an IR TAG 328 or 330 coming into the presence of an IR sensor 332, 334, or 336 will be examined. Second, the presence of the touch memory 312 coming into contact with the touch port 310 will be examined.

Referring to FIG. 5, first the IR sensor situation is analyzed. On system startup, before any stimuli from the IR TAGs 328 and 330 is received, the concentrator 104 first must establish communications with the various collectors and controllers 300, 302, 304, and 306. To do so, the concentrator 104 enters a node search mode, issuing a node search mode command. The various collectors and controllers 300–306 sequentially respond, and are assigned node numbers by the concentrator 104. The concentrator 104 further receives each of the collector and controller 300–306 unique identifications uniquely identifying those nodes. On system startup, the logger PC 100 also must establish communication with the concentrator 104. To facilitate this, the logger PC 100 first requests the next sequence number of the stimuli event from one of the various devices connected to the collectors and concentrators 300–306. The logger PC 100 does so by issuing an SNMP Get command with its variable number set to zero, and preferably with its class number set to zero, such as "96.0.0.0". The variable number set to zero requests identification of the next stimuli sequence number that will be received from the concentrator 104.

Further, the concentrator 104 can download status and firmware to the various collectors and controllers 300–306 using the SNMP indirect and load status variables, such as "96.0.1" and "96.0.3".

Once communication is established, the concentrator 104 polls each of the collectors and controllers 300–306 using invitation to transmit commands on the subnetwork. Each of these nodes then issues a pass command in response if it has not received a stimuli event from any of the various devices connected to that particular node. This continues until a stimuli event is returned.

Then an IR TAG, such as the IR TAG 328, enters the proximity of the IR sensor. 322, for example. At that point, the raw binary code is transmitted up to the IR collector 302. This code contains the unique TAG identification, as well as TAG status, such as its battery strength, its motion status, and the transmit sequence number. The IR collector 302 then has a stimuli event to report, so the next time the concentrator 104 polls the IR collector 302, instead of responding with a pass message, the IR collector 302 transmits a data packet to the concentrator 104 including the node number assigned by the concentrator 104 to the IR collector 302, as well as the data received from the IR TAG 328.

The concentrator 104 then has a stimuli event to report, including the node that received the stimuli, the particular sensor connected to the node, as well as the identification and status of the IR TAG 328 transmitting that data. This stimuli event will be the next SNMP sequence number, such as 1.

The logger PC 100 will have previously issued a Get stimuli report message to the concentrator 104 requesting the number of the next stimuli using "96.0.0.0". The logger PC 100 will then have followed that Get command with a Get command requesting the next sequence number of stimuli event, i.e., "96.0.0.0.1". That will be the stimuli as transmitted by the IR TAG 328. So, the concentrator 104 has a pending Get request for that particular sequence number, and transmits the data, including the particular node, the particular port connected to that node, as well as the unique identification of the IR TAG 328 and its status, onto the logger PC 100. The logger. PC 100 then logs this stimuli event into a log file, which can be accessed using standard DLL commands by other workstations on the network.

Now, assume that the touch memory device 312 is placed into the touch port 310. The messaging proceeds as with a transmission from the IR TAG 328, with the additional status that the device has been placed into the touch port 310. When the logger PC 100 receives this message, it may wish, for example, to buzz the piezoelectric sounder 412. The logger PC 100 will have a map indicating that the touch port 310 is connected to a particular collector on a particular port. Therefore, it sends a Set message to the concentrator 104, designating the RSN of the correct addressable transistor on the correct node and channel: "96.0.16.0.0.[RSN]". The concentrator 104 responds by sending a message to the collector 300, instructing the collector 300 to send an activation message to the appropriate addressable transistor 418 in the touch port 310. The touch collector 300 has a map of the unique identification of the addressable transistor 418 connected to its port one. It has generated this map on startup by scanning the addressable transistors connected to its various ports, and corresponding those ports with the various adjustable transistor connected. So, it then sends a pulse stream to the touch port 400 appropriate for activating the addressable transistor 418. This sounds the piezoelectric sounder, and the touch collector 300 then sends a follow-up appropriate message for deactivating the addressable transistor 418. The leads 408 and 410 are similarly activated through the addressable transistor 416.

It will further be appreciated that the relay contacts 320 can be similarly activated through the addressable transistor 318. Further, relays connected to the relay controller 304 are similarly activated by messages from the concentrator 104.

Alternatively, the system could be implemented such that the touch collector 300 does not maintain a map of the unique identifications of each of the addressable transistors. Instead, this map can be maintained in the logger PC after an appropriate scanning of the various collectors and controllers 300–304 on the system. Then, instead of a set message directed at the touch collector 300 and a particular port on that touch collector, the logger PC 100 then issues a set command directed at the specific RSN on the adjustable transistor 418. The concentrator 104 will then transmit a broadcast message to all of the collectors and controllers 300–306 on the subnetwork and each of those controllers would issue an appropriate data stream on all of its channels. Then, only the adjustable transistor 418 would respond, because the remainder of the addressable transistors had different unique identifications.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

APP 1

```
/* snoidapi.h:
// This interface can be included by C or C++ code
*/
#ifdef_cplusplus
extern "C" {
#endif /*_cplusplus */
// Info in a Tag Report
typedef struct {
        unsigned char type;          // 0xa1 for tag report, no xyz
        long dcmID;                      // rightmost 4 bytes of 6 byte SSN
        unsigned int modID;          // leftmost 2 bytes of 6 byte SSN
        unsigned int tagID;
        unsigned char tcount;
        unsigned char tstate;
        unsigned char smask;
        int x;                              // if type=0xa2 xyz in feet
        int y;
        int z;
        char reserve[10];
} TagReport;
/* oidStr is a null terminated ascii string e.g. "1.2.3.4.5" */
// prototypes
void FAR PASCAL_export snPollOid( );
#define GetContinuous 0x01    // distribute data and repeat the get
#define GetSequential 0x02    // use special sequence sliding-window Algo
#define GetPolled          0x04        // primes the polling for an OID
int FAR PASCAL_export snGetOid( HWND userWindow, char far * oidStr,
```

-continued

APP 1

```
                                                           unsigned int getMods, unsigned char far * ipAddr );
int FAR PASCAL_export snNextOid( HWND userWindow, char far * oidStr,
                                                           unsigned char far * ipAddr );
int FAR PASCAL_export snSetOid( HWND userWindow, char far * oidStr,
                                                           unsigned int valType, unsigned int vallen, unsigned char far * val,
                                                           unsigned char far * ipAddr ) ;
int FAR PASCAL_export snTrapOid( HWND userWindow, char far * oidStr,
                                                           unsigned char far * ipAddr ) ;
/*
    all of these next routines return the length of the requested field from
    the pdu and store in the pointer the value
/*
#ifdef_SNOIDS
int FAR PASCAL_export snPduAck( PDU * pdu, unsigned int seqNo ) ;
int FAR PASCAL_export snWotOid( PDU * pdu, unsigned int seqNo, char far * oidStr ) ;
int FAR PASCAL_export snWotRawOid( PDU * pdu, unsigned int seqNo, unsigned char far * roid ) ;
int FAR PASCAL_export snWotValType( PDU * pdu, unsigned int seqNo ) ;
int FAR PASCAL_export snWotVal( PDU * pdu, unsigned int seqNo, unsigned char far * val ) ;
int FAR PASCAL_export snWotIPAddr( PDU * pdu, unsigned int seqNo, unsigned char far * ipAddr ) ;
int FAR PASCAL_export snWotPduType( PDU * pdu, unsigned int seqNo ) ;
int FAR PASCAL_export snWotErr( PDU * pdu, unsigned int seqNo ) ;
int FAR PASCAL_export snWotErrX( PDU * pdu, unsigned int seqNo ) ;
int FAR PASCAL_export snTagRep( PDU * pdu, unsigned int seqNo, TagReport far * tr, unsigned int which ) ;
int FAR PASCAL_export snStimulusReport( PDU * pdu, unsigned int seqNo,
    char far * channel,
    char far * collectorId,
    char far * ipAddr,
    char far * stimulusId,
    char far * receptorClass,
    char far * qualifiers,
    unsigned int which ) ;
#else
int FAR PASCAL_export snPduAck (LONG pdu, unsigned int seqNo) ;
int FAR PASCAL_export snWotOid( LONG pdu, unsigned int seqNo, char far * oidStr ) ;
int FAR PASCAL_export snWotRawOid( LONG pdu, unsigned int seqNo, unsigned char far * roid ) ;
int FAR PASCAL_export snWotValType( LONG pdu, unsigned int seqNo ) ;
int FAR PASCAL_export snWotVal( LONG pdu, unsigned int seqNo, unsigned char far * val ) ;
int FAR PASCAL_export snWotIPAddr( LONG pdu, unsigned int seqNo, unsigned char far * ipAddr ) ;
int FAR PASCAL_export snWotPduType( LONG pdu, unsigned int seqNo ) ;
int FAR PASCAL_export snWotErr( LONG pdu, unsigned int seqNo ) ;
int FAR PASCAL_export snWotErrX( LONG pdu, unsigned int seqNo ) ;
int FAR PASCAL_export snTagRep( LONG pdu, unsigned int seqNo, TagReport far * tr, unsigned int which ) ;
int FAR PASCAL_export snStimulusReport( LONG pdu, unsigned int seqNo,
    char far * channel,
    char far * collectorId,
    char far * ipAddr,
    char far * stimulusId,
    char far * receptorClass,
    char far * qualifiers,
    unsigned int which ) ;
#endif
/* snOIDtoDDD - converts an ASN1 encoded OID to a dot-deliminated decimal
    string */
unsigned int FAR PASCAL_export snOIDtoDDD ( unsigned char oidLen, unsigned char far * oid,
    unsigned char far * ddd )      ;
#define WM_SNOIDRESP         (WM_USER+1)
#define WM_SNOIDTRAP         (WM_USER+2)
#ifdef_cplusplus
}
#endif
```

What is claimed is:

1. An object location and tracking system for tracking infrared transmitters that transmit identifying codes, comprising:

a computer network for passing messages;

a computer connected to said network, said computer including means for sending and receiving messages over said computer network in a variable-based protocol that implements object identifier variables;

a plurality of infrared sensors for receiving transmitted identifying codes from the infrared transmitters, said plurality of infrared sensors providing signals containing the transmitted identifying codes; and interface circuitry coupling said plurality of infrared sensors to said computer network, said interface circuitry including means for providing to said computer network object identifier variables in the variable-based protocol corresponding to the transmitted identifying codes received from said signals from said plurality of infrared sensors.

2. The object location and tracking system of claim 1, wherein the variable-based protocol that implements object identifier variables is Simple Network Management Protocol (SNMP).

3. The object location and tracking system of claim 2, wherein said interface circuitry appears on said computer network as an SNMP server and wherein said computer appears on said computer network as an SNMP client.

4. The object location and tracking system of claim 1, wherein said interface circuitry further comprises:

a subnetwork for passing messages;

controller circuitry connected to said plurality of infrared sensors and connected to said subnetwork, said controller circuitry including means for sending messages containing the transmitted identifying codes over said subnetwork; and concentrator circuitry connected to said subnetwork and connected to said computer network, said concentrator circuitry including means for providing to said computer network object identifier variables in the variable-based protocol in response to messages containing the transmitted identifying codes sent by said controller circuitry.

5. The object location and tracking system of claim 1 for further tracking the location of registered serial number devices providing unique identifying code, further comprising:

receptor circuitry with a physical receptor, said receptor circuitry providing a unique identifying signal representing the unique identifying code of a registered serial number device placed in said physical receptor;

said interface circuitry further coupling said receptor circuitry to said computer network, said interface circuitry further including means for providing to said computer network object identifier variables in the variable-based protocol corresponding to the unique identifying signal provided by said receptor circuitry.

6. The object location and tracking system of claim 5 for further providing responses to transmitted identifying codes, further comprising:

control circuitry coupled to said network, said control circuitry implementing object identifier variables and means for controlling external physical events responsive to said object identifier variables.

7. The object location and tracking system of claim 6, wherein said computer further comprises:

means for setting object identifier variables controlling the external physical events responsive to receiving object identifier variables indicating presence of a infrared transmitter.

8. The object location and tracking system of claim 1 for further providing responses to transmitted identifying codes, further comprising:

control circuitry coupled to said network, said control circuitry implementing object identifier variables and means for controlling external physical events responsive to said object identifier variables.

9. The object location and tracking system of claim 8, wherein said means for controlling external physical events further comprises:

an addressable transistor driving a light emitting diode.

10. The object location and tracking system of claim 8, wherein said means for controlling external physical events further comprises:

an addressable transistor driving a sounder.

11. The object location and tracking system of claim 8, wherein said means for controlling external physical events further comprises:

a relay controller.

12. The object location and tracking system of claim 8, wherein said computer further comprises:

means for setting object identifier variables controlling the external physical events responsive to receiving object identifier variables indicating presence of a infrared transmitter.

13. A method for tracking and locating objects in a system with a computer network, a computer connected to the computer network, infrared sensors, and interface circuitry connecting the computer network to the infrared sensors, the infrared sensors being adapted to receive unique identifying codes from infrared transmitters, comprising the steps of:

providing object identifier variables in the interface circuitry, said object identifier variables adapted for being communicated over the computer network in a variable based protocol;

receiving in one of the infrared sensors a transmission from one of the infrared transmitters containing a unique identifying code;

sending the received unique identifying code from the infrared sensor to the interface circuitry;

providing the unique identifying code in the interface circuitry to the computer network in association with an object identifier variable; and receiving in the computer the unique identifying code from the network by accessing its associated object identifier variable.

14. The method of claim 13 further comprising the step of:

sending an inquiry for the object identifier variable from the computer to the interface circuitry over the network; and wherein said step of providing the unique identifying code in the interface circuitry to the computer network does so responsive to said sending an inquiry.

15. The method of claim 13, wherein said object identifier variables are provided in SNMP format.

16. The method of claim 13 also for providing physical responses and the system also having an external device controller, further comprising the steps of:

sending a message from the computer to the external device controller, the message containing an object identifier variable associated with a channel of the external device controller instructing the external device controller to activate the channel, said message sent in response to said unique identifying code provided by the interface circuitry to the computer network;

activating in the external device controller the channel contained in the object identifier variable in response to receiving said message sent by the computer.

17. The method of claim 13, the system further including a physical receptor for a registered serial number device with unique identifying code coupled to the computer network by the interface circuitry, further comprising the steps of:

receiving the registered serial number device's unique identifying code in the physical receptor;

providing the registered serial number device's unique identifying code to the computer over the computer network in conjunction with an object identifier variable identifying the physical receptor.

18. A method for tracking and locating objects in a system with a computer network, a computer connected to the computer network, infrared sensors, and interface circuitry connecting the computer network to the infrared sensors, the infrared sensors being adapted to receive unique identifying codes from infrared transmitters, also for providing physical responses and the system also having an external device controller, comprising the steps of:

receiving in one of the infrared sensors a transmission from one of the infrared transmitters containing a unique identifying code;

sending the received unique identifying code from the infrared sensor to the interface circuitry;

providing the unique identifying code in the interface circuitry to the computer network;

receiving in the computer the unique identifying code from the network;

sending a message from the computer to the external device controller, the message containing an identification of a channel of the external device controller instructing the external device controller to activate the channel, said message sent in response to said unique identifying code provided by the interface circuitry to the computer network; and activating in the external device controller the channel identified in said sending a message step in response to receiving said message sent by the computer.

19. The object location and tracking system of claim 1, wherein the interface circuitry further includes components for coupling said plurality of sensors to said computer network, and further includes means for providing to said computer network object identifier variables in the variable-based protocol corresponding to status of and control of the components.

* * * * *